United States Patent
Mariappasamy et al.

(10) Patent No.: US 12,346,637 B2
(45) Date of Patent: *Jul. 1, 2025

(54) AUTOMATED MODELLING SYSTEM

(71) Applicant: Detroit Engineered Products, Inc., Troy, MI (US)

(72) Inventors: Radhakrishnan Mariappasamy, Troy, MI (US); Raymond E. Chaney, Auburn Hills, MI (US)

(73) Assignee: Detroit Engineered Products, Inc., Troy, MI (US)

( * ) Notice: Subject to any disclaimer, the term of this patent is extended or adjusted under 35 U.S.C. 154(b) by 953 days.

This patent is subject to a terminal disclaimer.

(21) Appl. No.: 17/338,905

(22) Filed: Jun. 4, 2021

(65) Prior Publication Data

US 2021/0294938 A1  Sep. 23, 2021

Related U.S. Application Data

(63) Continuation of application No. 16/666,566, filed on Oct. 29, 2019, now Pat. No. 11,030,361.

(60) Provisional application No. 62/753,253, filed on Oct. 31, 2018.

(51) Int. Cl.
*G06F 30/17* (2020.01)
*G06F 30/23* (2020.01)

(52) U.S. Cl.
CPC .............. *G06F 30/17* (2020.01); *G06F 30/23* (2020.01)

(58) Field of Classification Search
CPC .................................. G06F 30/17; G06F 30/23
See application file for complete search history.

(56) References Cited

U.S. PATENT DOCUMENTS

| | | | |
|---|---|---|---|
| 7,467,074 B2 | 12/2008 | Faruque | |
| 8,751,202 B2 | 6/2014 | Powell | |
| 10,019,543 B1 | 7/2018 | Kanthasamy | |
| 2007/0038422 A1 | 2/2007 | Wang | |
| 2007/0046695 A1 | 3/2007 | Bamberg | |

(Continued)

FOREIGN PATENT DOCUMENTS

WO    2017142953 A1    2/2017

OTHER PUBLICATIONS

Munipalli R, Szema KY, Huang PY, Rowell CM, Ying A, Abdou M. CAD-centric computation management system for a virtual TBM. HyPerComp Inc.; May 3, 2011. (Year: 2011).*

(Continued)

*Primary Examiner* — Chuen-Meei Gan
(74) *Attorney, Agent, or Firm* — Inskeep IP Group, Inc.

(57) ABSTRACT

An automated modelling system for automatically and quickly creating computer-aided-engineering model of body in white structures such as members, braces, and joints based on limited inputs from a user. The automated modelling system generally includes a computer system which receives various inputs from the user, including but not limited to trajectories, axis along height, any base components, height, width, angle, size, radius, thickness, and the like. Using these inputs, the computer system will automatically create the desired elements, such as members, braces, or joints, based on user inputs. The computer system may also adjust existing elements, mesh elements, and parameterize elements based on user inputs received via an interface displayed on the computer system.

13 Claims, 33 Drawing Sheets

(56) References Cited

U.S. PATENT DOCUMENTS

| | | |
|---|---|---|
| 2012/0209577 A1 | 8/2012 | Powell |
| 2014/0277669 A1* | 9/2014 | Nardi .................... G06F 30/20 |
| | | 700/103 |
| 2016/0008095 A1 | 1/2016 | Matov |
| 2016/0364512 A1* | 12/2016 | Grip .................... G06F 30/23 |
| 2017/0091900 A1 | 3/2017 | Mariappasamy |
| 2019/0030751 A1 | 1/2019 | Czinger |
| 2019/0096120 A1 | 3/2019 | Remy |
| 2019/0138673 A1 | 5/2019 | Roberts |

OTHER PUBLICATIONS https://abaqus-docs.mit.edu/2017/English/SIMACAECAERefMap/simacae-c-mgnconcmeshingbumethods.htm; "Bottom-Up Meshing Methods" Webpage from MIT; 2017.

PCT International Search Report and Written Opinion for PCT/US2019/059005; Jan. 14, 2020.

"Digital Planning Validation in Automotive Industry"; Science Direct Article for Computers in Industry; Gunter Wohlke; Mar. 31, 2005.

"Integrating Case-Based with Rule-Based Reasoning in Body-in-White Fixture Design"; Article from The International Journal of Advanced Manufacturing Technology; Junhua Zhang; 2016.

* cited by examiner

FIG. 2A
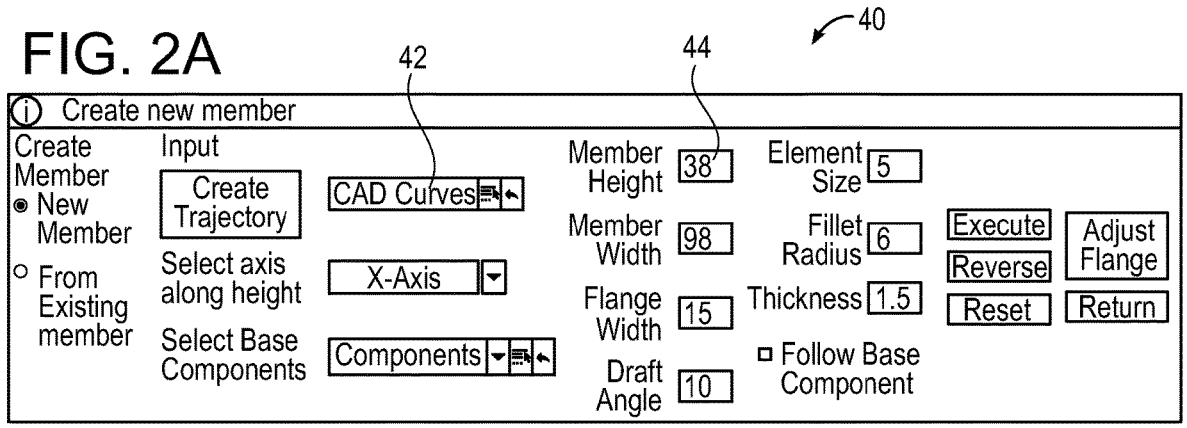
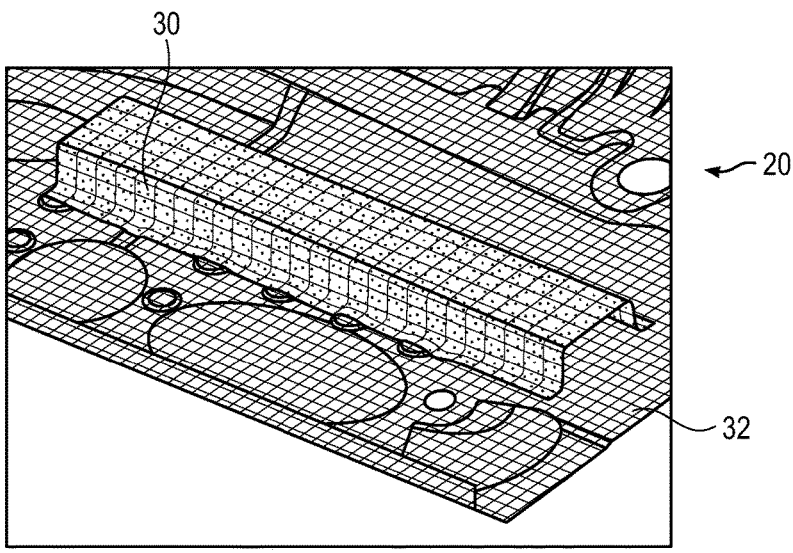
FIG. 2B
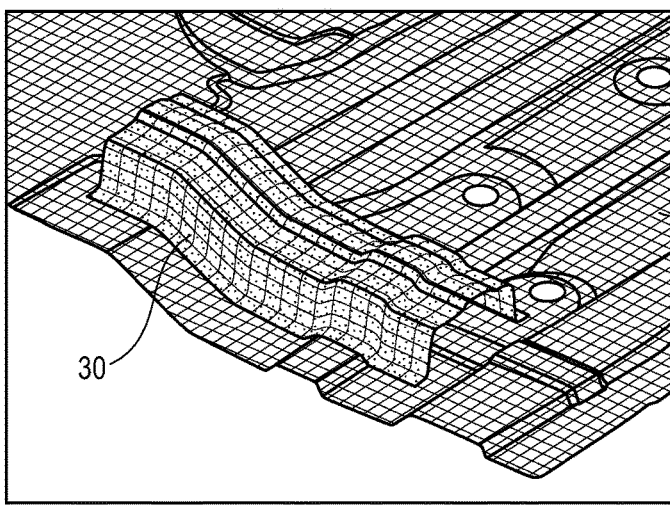
FIG. 2C

FIG. 3A
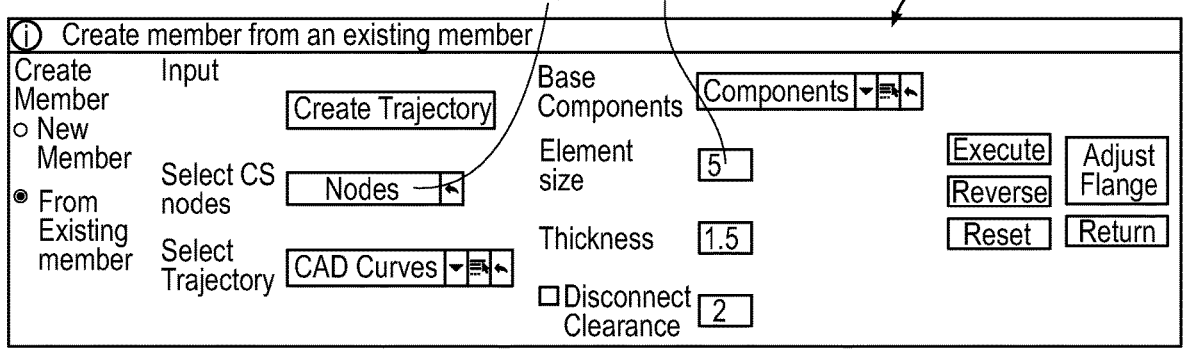
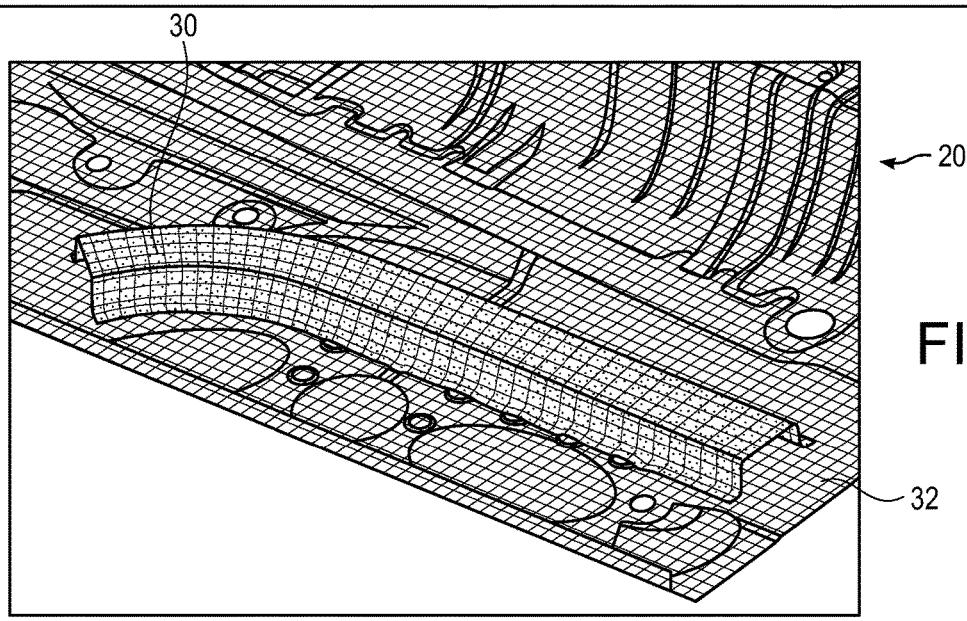
FIG. 3B
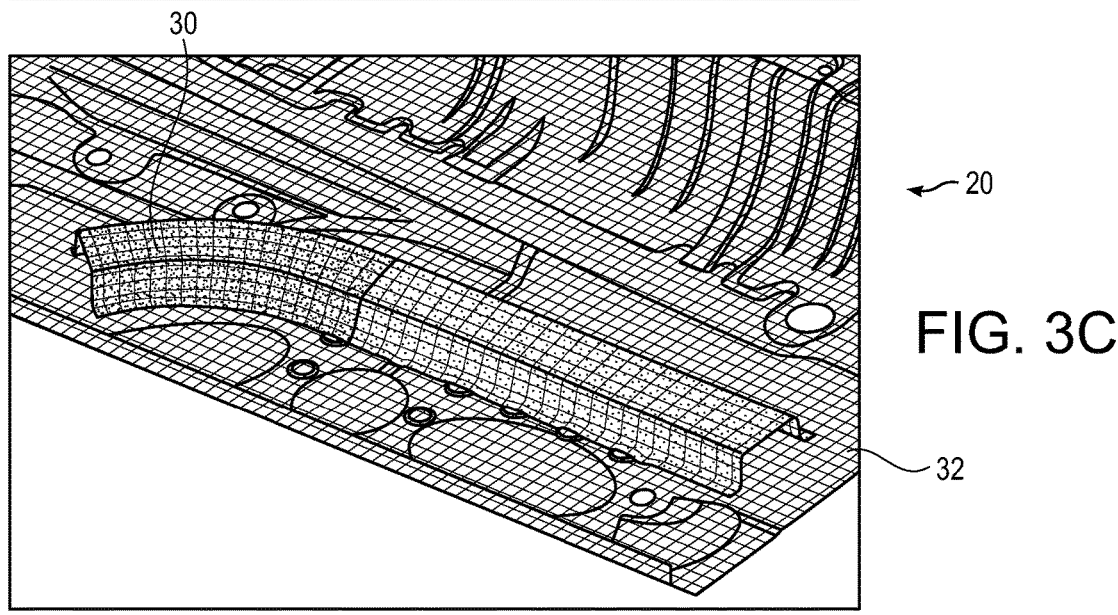
FIG. 3C

FIG. 27A
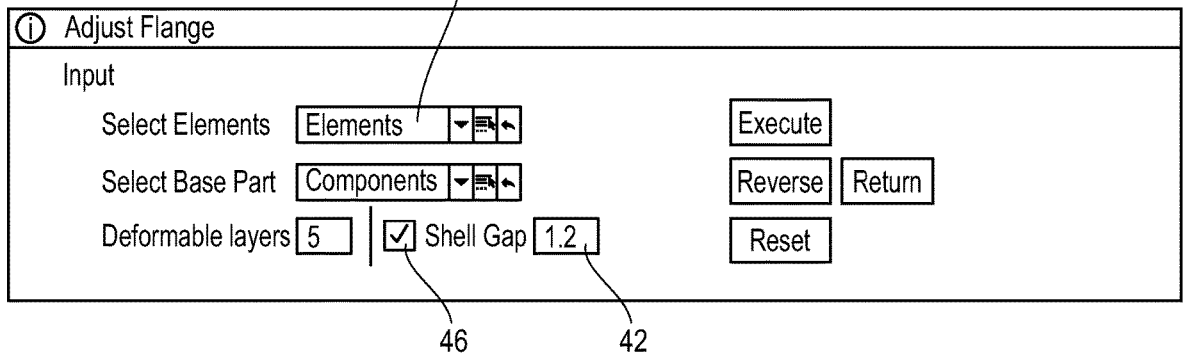
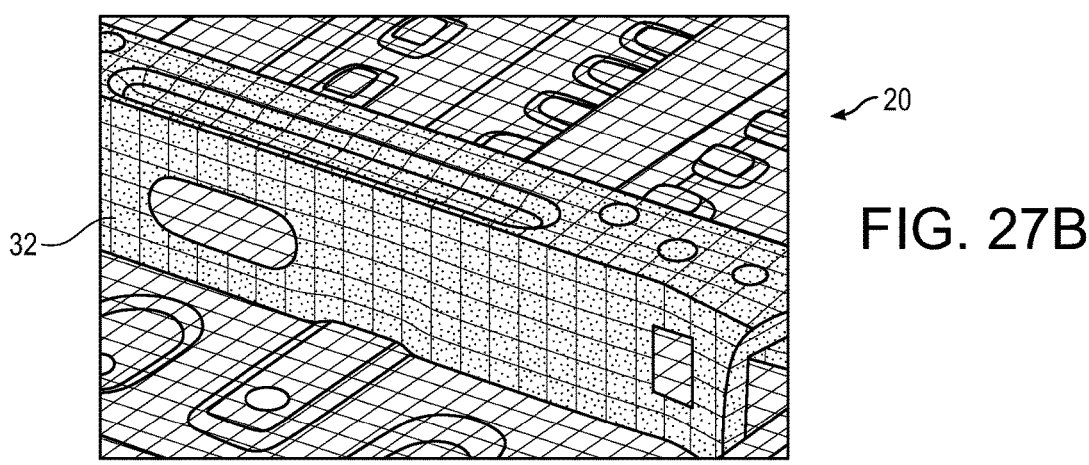
FIG. 27B
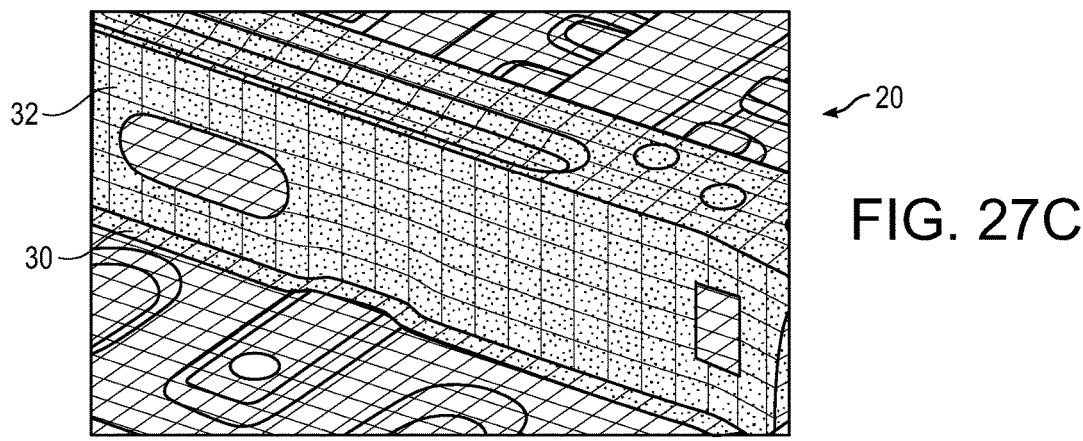
FIG. 27C

AUTOMATED MODELLING SYSTEM

CROSS REFERENCE TO RELATED APPLICATIONS

The present application is a continuation of U.S. application Ser. No. 16/666,566 filed Oct. 29, 2019 which issues as U.S. Pat. No. 11,030,361 on Jun. 8, 2021, which claims priority to U.S. Provisional Application No. 62/753,253 filed Oct. 31, 2018. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to an automated modelling system for quickly and efficiently create, morph, adjust, revise, and parameterize concept computer-aided-engineering models of body-in-white structures such as members, brace, and joints based on limited inputs from the user.

Related Art

Any discussion of the related art throughout the specification should in no way be considered as an admission that such related art is widely known or forms part of common general knowledge in the field.

Concept modelling of body-in-white (BIW) structure such as members, braces, and joints has been previously used in the computer-aided-engineering (CAE) field. As the complexity of these structures is increased, the time taken to create the structures also increases. Further, more and more training is necessary for the engineer to have the requisite level of expertise to create such structures as their complexity increases over time.

A finite element model is typically derived from a computer-aided-design (CAD) model. Often, concept designs are generated for various reasons such as optimizing the existing design or utilizing the previous design to achieve a new design. In some cases, the CAD data may not be available. In such cases, it is extremely burdensome to generate a finite element model without the CAD data since such a process requires a lot of steps and functions needed to be carried out in a particular order to obtain the desired structure.

SUMMARY

An example embodiment is directed to an automated modelling system. The automated modelling system includes a computer system which receives various inputs from the user, including but not limited to trajectories, axis along height, any base components, height, width, angle, size, radius, thickness, and the like. Using these inputs, the computer system will automatically create the desired elements, such as members, braces, or joints, based on user inputs. The computer system may also adjust existing elements, mesh elements, and parameterize elements based on user inputs received via an interface displayed on the computer system.

There has thus been outlined, rather broadly, some of the embodiments of the automated modelling system in order that the detailed description thereof may be better understood, and in order that the present contribution to the art may be better appreciated. There are additional embodiments of the automated modelling system that will be described hereinafter and that will form the subject matter of the claims appended hereto. In this respect, before explaining at least one embodiment of the automated modelling system in detail, it is to be understood that the automated modelling system is not limited in its application to the details of construction or to the arrangements of the components set forth in the following description or illustrated in the drawings. The automated modelling system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 2A is a view of an exemplary interface used for creating a new member of an automated modelling system in accordance with an example embodiment.

FIG. 2B is a perspective view of a finite element model of a newly-created member of an automated modelling system in accordance with an example embodiment.

FIG. 2C is a perspective view of a finite element model of a newly-created member following a base component of an automated modelling system in accordance with an example embodiment.

FIG. 3A is a view of an exemplary interface used for creating a new member from an existing member of an automated modelling system in accordance with an example embodiment.

FIG. 3B is a perspective view of a finite element model of a newly-created member from an existing member of an automated modelling system in accordance with an example embodiment.

FIG. 3C is a perspective view of a finite element model of a newly-created member from an existing member of an automated modelling system in accordance with an example embodiment.

FIG. 27A is a view of an exemplary interface used for adjusting a flange of an automated modelling system in accordance with an example embodiment.

FIG. 27B is a perspective view of a finite element model of a flange of an automated modelling system in accordance with an example embodiment.

FIG. 27C is a perspective view of a finite element model of an adjusted flange of an automated modelling system in accordance with an example embodiment.

DETAILED DESCRIPTION

A. Introduction

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. The present invention may be operated as a computer program installed upon a computer-aided-design computer (i.e. a computer used for computer-aided-design, such as with a CAD program as known in the arts), via a website or other system.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), flash drives, USB drives and computer instruction signals embodied in a transmission medium (with or without a carrier wave upon which the signals are modulated). For example, the transmission medium may include a communications network, such as the Internet.

B. Exemplary Computer System

Figure 1:
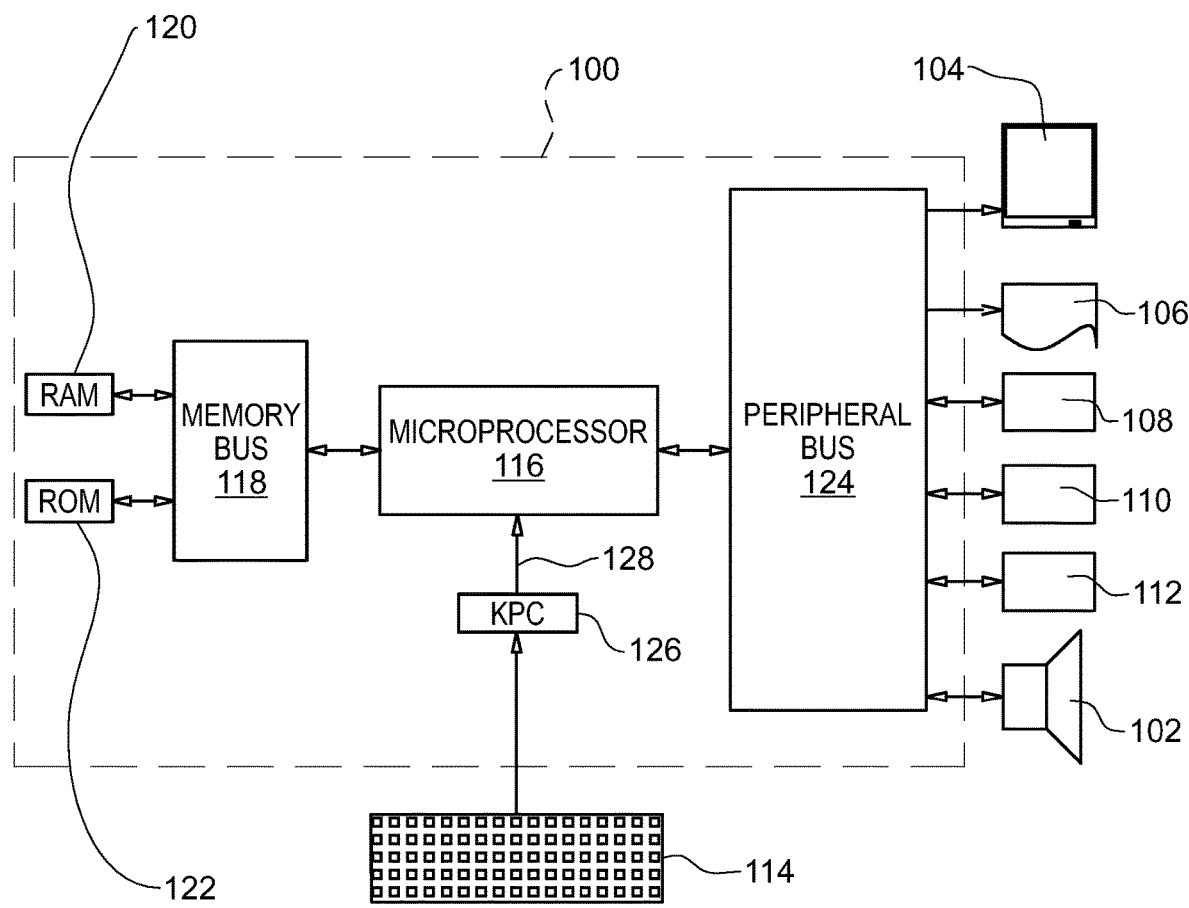
FIG. 1 is a block diagram of an exemplary computer system of an automated modelling system in accordance with an example embodiment.

FIG. 1 is a block diagram of an exemplary computer system 100 for practicing the various aspects of the present invention. The computer system 100 includes a display screen (or monitor) 104, a printer device 106, a floppy disk drive 108, a hard disk drive 110, a network interface 112, and a keyboard 114. The computer system 100 also includes a microprocessor 116, a memory bus 118, random access memory (RAM) 120, read only memory (ROM) 122, a peripheral bus 124, and a keyboard controller 126. Computer system 100 can be a personal computer (such as an APPLE computer, an IBM computer, or one of the compatibles thereof), a workstation computer (such as a SUN MICROSYSTEMS or HEWLETT-PACKARD workstation), or various other types of computers. It can be appreciated that the computer system 100 may be comprised of various other electronic devices including but not limited to mobile phones, telephones, personal digital assistants (PDAs), handheld wireless devices, two-way radios, smart phones, communicators, video viewing units, television units, television receivers, cable television receivers, pagers, communication devices, and digital satellite receiver units.

The microprocessor 116 is a general-purpose digital processor that controls the operation of the computer system 100. Microprocessor 116 can be a single-chip processor or implemented with multiple components. Using instructions retrieved from memory, microprocessor 116 controls the reception and manipulations of input data and the output and display of data on output devices.

The memory bus 118 is utilized by the microprocessor 116 to access the RAM 120 and the ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output and storage devices used by the computer system 100. In the described embodiment(s), these devices include a display screen 104, a printer device 106, a floppy disk drive 108, a hard disk drive 110, and a network interface 112. A keyboard controller 126 is used to receive input from the keyboard 114 and send decoded symbols for each pressed key to microprocessor 116 over bus 128.

The display screen 104 is an output device that displays images of data provided by the microprocessor 116 via the peripheral bus 124 or provided by other components in the computer system 100. The printer device 106 when operating as a printer provides an image on a sheet of paper or a similar surface. Other output devices such as a plotter, typesetter, etc. can be utilized in place of, or in addition to, the printer device 106.

The floppy disk drive 108 and the hard disk drive 110 can be utilized to store various types of data. The floppy disk drive 108 facilitates transporting such data to other computer systems, and the hard disk drive 110 permits fast access to large amounts of stored data.

The microprocessor 116 together with an operating system operate to execute computer code and produce and use data. The computer code and data may reside on RAM 120, ROM 122, or hard disk drive 110. The computer code and data can also reside on a removable program medium and loaded or installed onto computer system 100 when needed. Removable program mediums include, for example, CD-ROM, PC-CARD, floppy disk and magnetic tape.

The network interface 112 circuit is utilized to send and receive data over a network connected to other computer systems. An interface card or similar device and appropriate software implemented by microprocessor 116 can be utilized to connect the computer system 100 to an existing network and transfer data according to standard protocols.

The keyboard 114 is used by a user to input commands and other instructions to the computer system 100. Other types of user input devices can also be used in conjunction with the present invention. For example, pointing devices such as a computer mouse, a track ball, a stylus, or a tablet to manipulate a pointer on a screen of the computer system 100.

The present invention can also be embodied as computer readable code on a computer readable medium. The computer readable medium is any data storage device that can store data which can be thereafter be read by a computer system. Examples of the computer readable medium include read-only memory, random-access memory, magnetic data storage devices such as diskettes, and optical data storage devices such as CD-ROMs. The computer readable medium can also be distributed over a network coupled computer systems so that the computer readable code is stored and executed in a distributed fashion.

The present invention may be embodied within various languages and technologies such as but not limited to JAVA, JAVASCRIPT, JSCRIPT, WMLSCRIPT, ACTIVEX, CGI, scripts, plug-ins, BASIC, VISUAL BASIC, C, C++, COBOL, FORTRAN, ADA, HTML, DHTML, XML, SGML, WML, HDML, FLASH, SHOCKWAVE, GIF, JPEG, ADOBE ACROBAT, PDF, MICROSOFT WORD, and PASCAL. The present invention may be operated upon various operating systems such as but not limited to UNIX, MACINTOSH, LINUX, WINDOWS, PALMOS, EPOC, WINDOWS CE, FLEXOS, OS/9, and JAVAOS.

B. Exemplary Global Computer Network

The global computer network (e.g. Internet) is an exemplary communications network which may be utilized in combination with the present invention. The Internet is basically comprised of a "global computer network." A plurality of computer systems 100 around the world are in communication with one another via this global computer network and are able to transmit various types of data between one another. The communications between the computer systems may be accomplished via various methods such as but not limited to wireless, Ethernet, cable, direct connection, telephone lines, and satellite. One or more web servers typically provide the data to the computer systems connected via the Internet.

The present invention may also be utilized upon global computer networks, local area networks (LAN), wide area networks (WAN), campus area networks (CAN), metropolitan-area networks (MAN), and home area networks (HAN). Various protocols may be utilized by the electronic devices for communications such as but not limited to HTTP, SMTP, FTP and WAP (Wireless Application Protocol). The present invention may be implemented upon various wireless networks such as but not limited to CDPD, CDMA, GSM, PDC, PHS, TDMA, FLEX, REFLEX, IDEN, TETRA, DECT, DATATAC, and MOBITEX. The present invention may also be utilized with online services and internet service providers such as AMERICA ONLINE (AOL), COMPUSERVE, WEBTV, and MSN INTERNET SERVICES. The present invention preferably utilizes the Internet for transmitting data, however it can be appreciated that as future technologies are created that various aspects of the invention may be practiced with these improved technologies.

The present invention is preferably embodied within a software application installed upon the computer-aided-design computer system 100. Any type of computer system 100 known in the art may be utilized to practice the present invention, including personal computers, laptop computers, tablet computers, smart phones and the like. The present invention may also be embodied in various other manners such as but not limited to a central server computer or a web server that performs all functionality server-side and merely provide the results of the morphed CAD data to the computer system 100.

C. CAD Files.

The present invention is adapted to automatically, quickly, and efficiently create Concept CAE models of BIW structures such as members, braces, and joints based on limited inputs from the user. The system may utilize existing CAD data in some embodiments. The CAD data may be embodied in various types of files known in the art to store CAD data to assist with computer-aided-design. Various file formats known in the art may be utilized, such as .STEP, .IGS, .X_T, .X_B, .PRT, .CATPART, among others. The CAD data may have been previously compiled or prepared using any number of CAD software programs known in the art, such as AUTOCAD as offered by Autodesk, Inc. The CAD data may include meshing, or meshing may be added as discussed herein.

The CAD data may include one or more elements, such as members 30, braces, or joints. The CAD data file may incorporate a CAD element model 20 which may be accessed, adjusted, revised, and parameterized automatically by the systems and methods described herein. The various elements such as geometric features of the CAD element model 20 may be carried forward into a parametrized model automatically by the computer system 100.

The CAD data file may be in a computer readable file format and may be available directly from the computer or via downloading through a global computer network. In some embodiments, the CAD data file may be retained on a remote server and the functionality of the present invention may be performed either by the local computer or by the remote server directly, with the results being transmitted to the local computer after processing.

D. Operation of the Present Invention

Throughout the present application, the term "member(s) 30" is used to denote various structures, components, or devices that may be generated, adjusted, or parametrized in the finite element model 20 automatically by the computer system 100 based on user inputs. Although the terms "joint", "brace", "fillet", "hole", and the like are used separately in some cases than the word "member(s) 30", it should be appreciated that the term "member(s) 30" as used herein includes, without limitation, any structures, components, devices, braces, joints, members, fillets, holes, bosses, and the like which may be generated, adjusted, or parametrized within the finite element model 20 by the computer system 100.

The methods and systems described herein may be utilized to automate various concept design processes. For example, the process to create a new member 30 and join the member 30 to surrounding parts can be automated using the methods and systems described herein to reduce the time of such a process from hours down to minutes. Since the process is very fast and highly automated, early stage design changes and development time in several industries can be greatly reduced and no or limited training required for setting up the parameters.

The systems and methods described herein may ease the concept design process by creating a finite element part like a member 30, brace, or joint without first having the CAD data in a quick and efficient manner, thus saving the time that is required to create the concept structures. Using the systems and methods described herein, a user may provide the inputs 42 of the cross-section of the member 30 to be created for initial designs, as well as a base component 32 and a trajectory which defines the path of the member 30.

Figure 32:
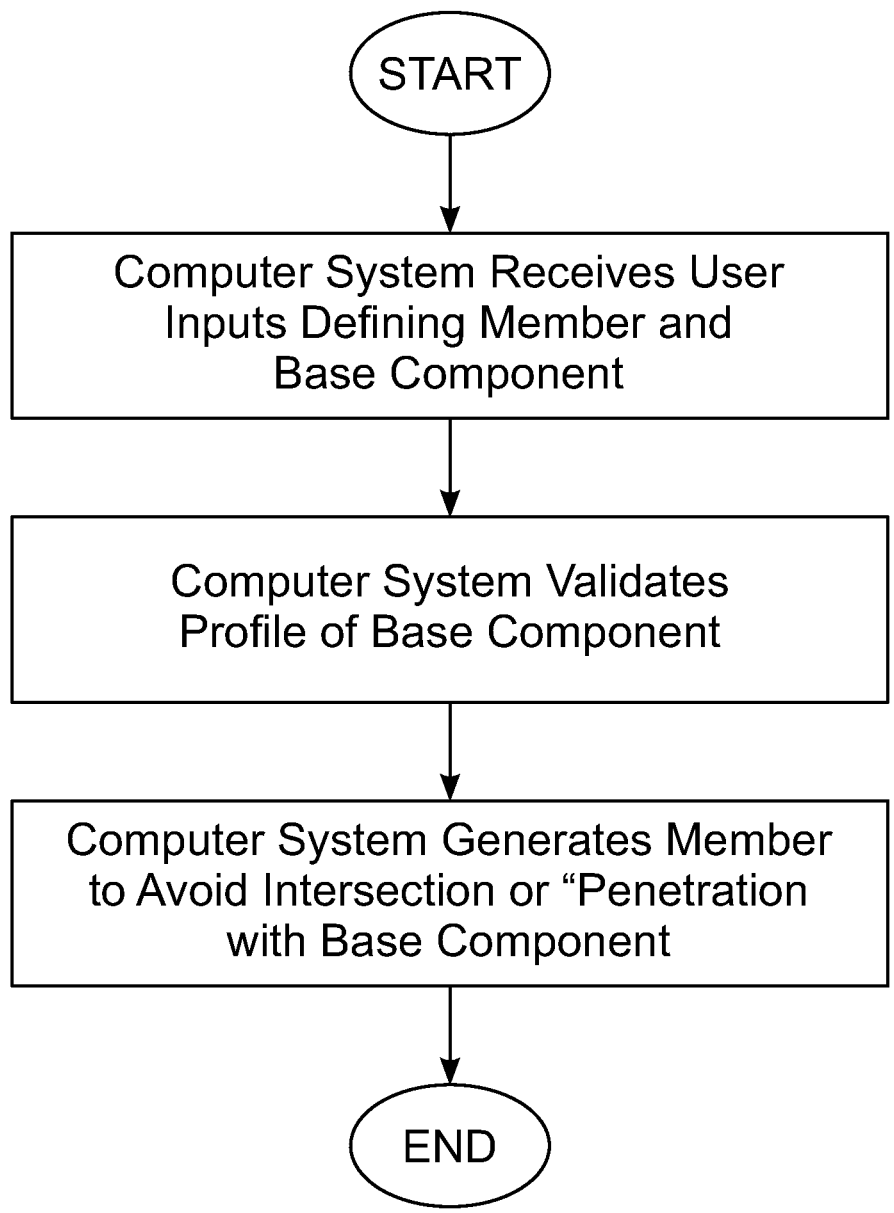
FIG. 32 is a flowchart illustrating an exemplary method of generating a member without interference by a computer system of an automated modelling system in accordance with an example embodiment.

Using the inputs 42 from the user, the automated modelling systems 10 described herein may also validate the profile of the base component 32 such that, while creating the member 30, it does not cause any intersection, penetration, or other interference with the base component 32 as shown in FIG. 32. Similarly, in the case of joint creation, the user may provide inputs 42 such as cross-section of the joint, direction of extensions, and flange width. The automated modelling systems 10 will create the joint as per the user requirements, making sure that the joint is not intersecting, penetrating, or otherwise interfering with the base component 32 as well as the connecting component.

After creating the members 30, joints, braces, or the like, the user may quickly change the dimensions of the created structure as a onetime morph. The user may also utilize the automated modelling systems 10 to automatically create the parameters (parameterize) on the created structures for further optimization studies.

Figure 29:
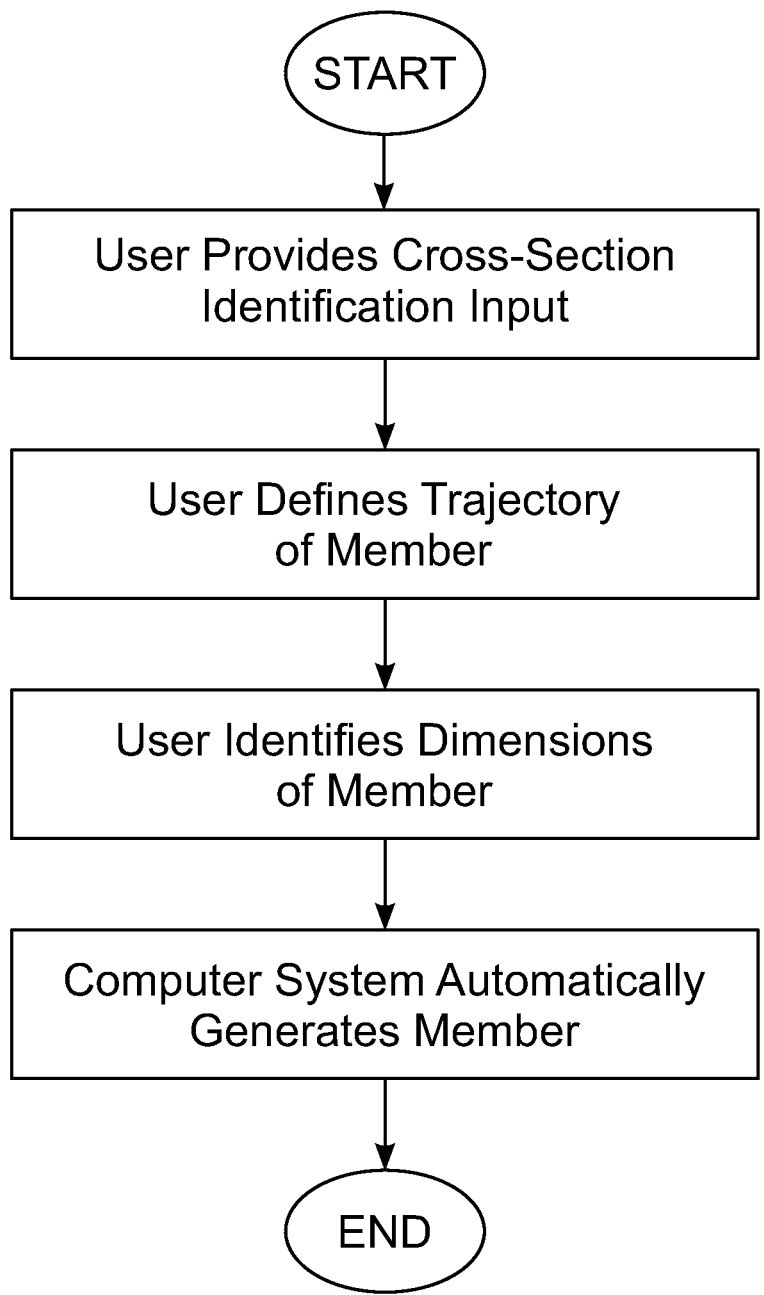
FIG. 29 is a flowchart illustrating an exemplary method of automatically generating a member by a computer system of an automated modelling system in accordance with an example embodiment.
Figure 30:
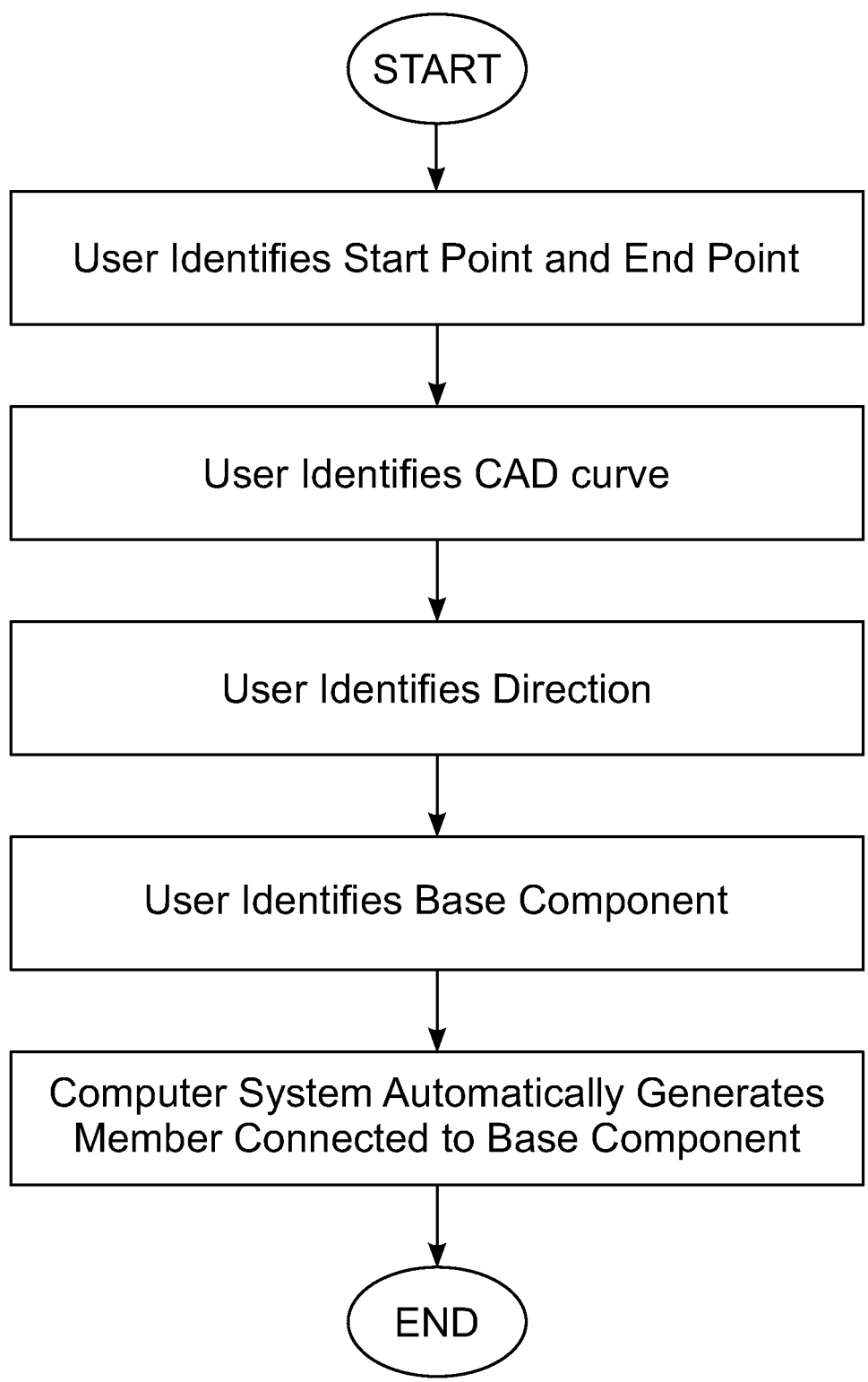
FIG. 30 is a flowchart illustrating an exemplary method of automatically generating a member connected to a base component by a computer system of an automated modelling system in accordance with an example embodiment.

As discussed herein, the systems and methods described herein may utilize limited inputs 42 from a user to automate the process of concept modelling of various members 30, braces, joints, or the like of the finite element model 20. By way of example, inputs 42 could include the cross-sectional information of the member 30, identification of any base or connecting components, the trajectory of the member 30 profile, and the direction of extension such as shown in FIGS. 29 and 30. Using this information, the systems and methods described herein may be utilized to form the members 30, braces, joints, or the like in the given finite element model 20 without pre-existing CAD data.

In the case of member 30 creation, based on the inputs 42 from the user, the systems and methods described herein may create the member 30 and also validate the profile of the base component 32 so that, while creating the member 30, it does not cause any interference, such as intersection or penetration, with the base component 32.

Figure 31:
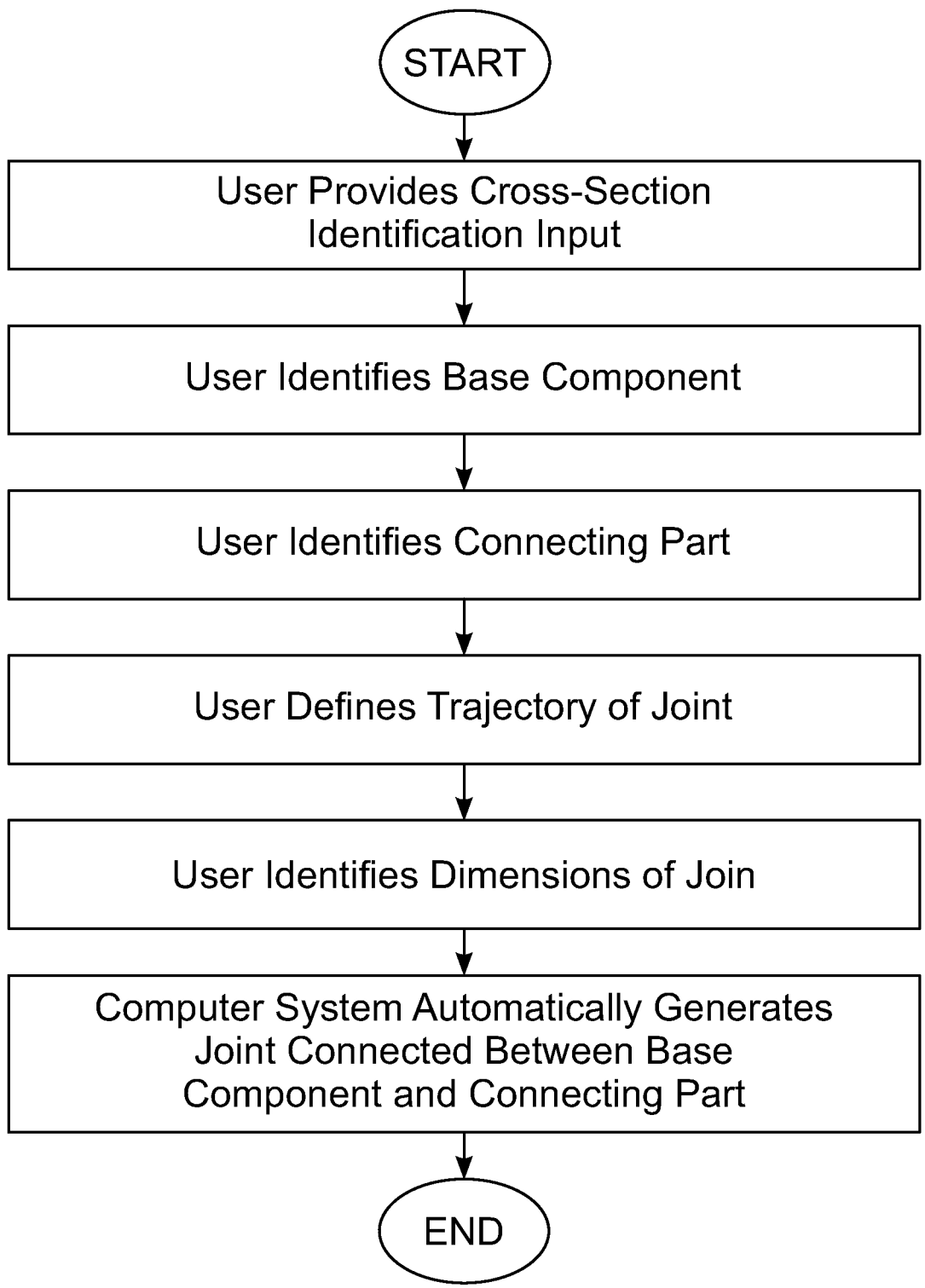
FIG. 31 is a flowchart illustrating an exemplary method of automatically generating a joint connected between a base component and a connecting part by a computer system of an automated modelling system in accordance with an example embodiment.

Similarly, in the case of joint creation, the user may provide inputs 42 such as cross-section of the joint, direction of extensions, and flange width. The joint is created per the user requirements in an automated manner to ensure that the joint is not intersecting or penetrating to the base as well as the connecting component such as shown in FIG. 31.

Figure 33:
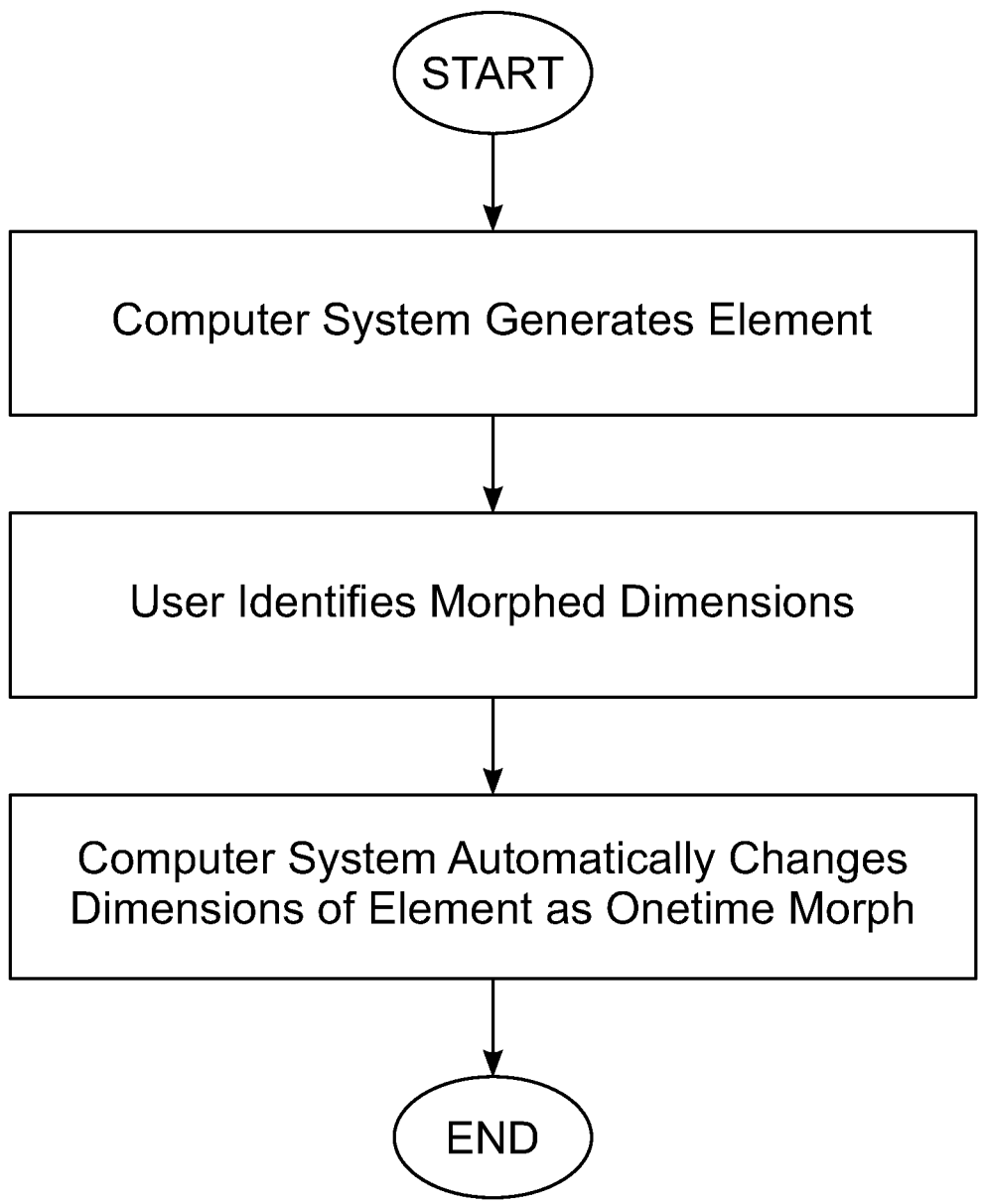
FIG. 33 is a flowchart illustrating an exemplary method of automatically changing dimensions of a member by a computer system of an automated modelling system in accordance with an example embodiment.

After creating the members 30 and joints, the user has the freedom to quickly change the dimensions of the member/brace and the joint as a onetime morph as shown in FIG. 33 or also create the parameters automatically on them for further analysis and optimization. By way of example and without limitation, the systems and methods shown and described in U.S. patent application Ser. No. 16/124,797, published as United States Patent Publication No. 2019/0073438, covering an "Automated Process for Parametric Modeling", which is hereby incorporated by reference, may be utilized to automatically parameterize the resulting finite element model 20.

The exemplary figures herein illustrate a number of different embodiments of various interfaces 40 which may be displayed to a user of the methods and systems described herein to present information to the user or to collect information/data from the user. It should be appreciated that the exemplary interfaces 40 shown in the figures are merely for illustrative, exemplary purposes, and thus should not be construed as limiting in scope. The shape, arrangement, orientation, and make-up of any interfaces 40 used may vary widely in different embodiments to suit different types of users and different types of applications.

The systems and methods described herein may be utilized to quickly, efficiently, and automatically create a member 30, joint, or other component solely from user inputs 42. The user will generally select a start point, an end point, a CAD curve, a direction, and a base component 32. Using this information, the computer system 100, using the methods and systems described herein, can quickly and efficiently create the member 30, joint, or other component without further input 42 from the user. If being connected to a base component 32, the member 30, joint, or other component may automatically take the shape of the base component 32. The systems and methods described herein may also be utilized to automatically extend part of the created member 30, joint, or other component to form flanges, such as for welding.

A number of interfaces 40 are described below and shown in the figures. Each of these interfaces 40, including the selection, orientation, arrangement, and positioning of inputs 42, may vary in different embodiments and thus should not be construed as limited by the exemplary descriptions and figures herein.

Each of the interfaces 40 described herein may include options for "execute", "reverse", and "reset". The execute button is selected to execute automated creation of the desired component, joint, or brace by the computer system 100 based on user inputs 42 entered into the interface 40. The reverse button may be utilized to reverse the directions, orientation, alignment, or positioning of the desired component, joint, or brace. The reset button may be utilized to reset back to a model backup that is taken prior to execution of the process.

i. Member Creation.

FIGS. 2A-2C illustrate the creation of a new member 30 of a finite element model 20. As shown in FIG. 2A, an interface 40 may be displayed, such as by the computer system 100, to be viewed by the user. The interface 40 may comprise a plurality of inputs 42 in which the user may enter data to be processed by the computer system 100 to form the new member 30 in the finite element model 20.

It should be appreciated that the new member 30 creation interface 40 may vary in different embodiments, and thus should not be construed as limited by the exemplary figures. In the exemplary embodiment shown in FIG. 2A, the new member 30 creation interface 40 includes a plurality of inputs 42. By way of example and without limitation, the inputs 42 may include trajectory (CAD Curve) selection, axis along height selection, base components 32 selection, member 30 height, member 30 width, flange width, draft angle, element size, fillet radius, thickness, and follow base component 32.

It should be appreciated that there are many methods with which a cross section may be defined. By way of example and without limitation, a cross section may be defined by extracting from existing FE mesh (intersection), extraction from CAD surface (intersection), user defined (sketching), importing cross section from an external source in the form of IGES, STEP, PARASOLID, etc.

The manner in which the computer system 100 creates the member 30 in the finite element model 20 will vary depending on whether the follow base component 32 input 42 is selected as ON or OFF. FIG. 2B illustrates a member 30 which has been created with the follow base component 32 input 42 being selected as OFF. In such an embodiment, the computer system 100 will first create a pair of nodes on the defined trajectory line, with the first node being at the start of the trajectory line and the second node being at the end of the trajectory line. Nodes are created along the trajectory line, with the number of nodes being defined by dividing the length of the trajectory line by the element size input 42 received from the user.

The axis along height provided by user input 42 and the vector nodes provide the forward direction of the member 30. Using the cross product of these two directions, the computer system 100 may determine the direction along width of the member 30. Additional nodes are created and translated in respective directions and by respective distances based on the input 42 cross section values.

The thickness of the base component 32 is identified by the computer system 100. A CAD curve cross section is obtained by translating certain nodes in the axis along height direction for a value of A=[(Thickness of base component 32+Member 30 thickness)/2] and then connecting these nodes. A line fillet for the CAD cross section may be created for the fillet radius value previously input 42 by the user to output a cad fillet cross section.

A 1D mesh may be created on the CAD fillet cross section for a given element size, with the element size having been previously input 42 by the user, to produce a 1D cross section as an output. A 2D mesh may be created using a "sweep" tool, which relies on the 1D cross section, the user-provided trajectory line, and the user-provided element size, to produce a swept mesh as an output. The computer system 100 may then identify flange on the swept mesh to identify a flange section as a separate component.

The computer system 100 may then be utilized to create a morphset comprising control nodes, deformable nodes, and fixed nodes. The control nodes are identified as the flange section, the deformable nodes are identified as "Y" number of adjacent element layers, where Y=(Member 30 height/Element size), with both member 30 height and element size being input 42 by the user. The fixed nodes are identified as the $(Y+1)^{th}$ layer. Thus, the flange morphset is created by the computer system 100.

The flange section may then be projected to the target element (base components 32) along normal direction. The computer system 100 may use an offset tool to offset the flange section for a value of "A" in a normal direction, where A=[(Thickness of base component 32+member 30 thickness)/2]. The flange morphset may then be unlinked and deleted.

The new member 30 is finally created by organizing the swept mesh and flange section to form the new member 30. A property card may be created and stored on the computer system 100 for a given member 30 thickness and assigned to the new member 30. FIG. 2B illustrates an exemplary new member 30 resulting from the methods described above for new member 30 creation.

FIG. 2C illustrates a new member 30 having been created with the follow base component 32 input 42 being selected as ON. The same steps are utilized to create the flange section as a separate component. A 1D mesh may be created using the nodes for a given element size. A sweep tool may be utilized to create a 2D mesh using the trajectory line and element size. The resulting mesh may be projected to the target element (base components 32) along normal direction. The remaining steps described above may then be followed to create the new member 30, which will follow the base component 32.

As seen in FIG. 2B, a new member 30 has been created that does not follow along the base component 32. FIG. 2C illustrates such a new member 30 which follows the base component 32 (note that the contour of the new member 30 follows the contour of the underlying base component 32).

FIGS. 3A, 3B, and 3C illustrate the creation of a new member 30 from an existing member 30 of a finite element model 20. As shown in FIG. 3A, an interface 40 may be displayed, such as by the computer system 100, to be viewed by the user. The interface 40 may comprise a plurality of inputs 42 in which the user may enter data to be processed by the computer system 100 to form the new member 30 from an existing member 30 in the finite element model 20.

It should be appreciated that the new member 30 from an existing member creation interface 40 may vary in different embodiments, and thus should not be construed as limited by the exemplary figures. In the exemplary embodiment shown in FIG. 3A, the new member 30 from an existing member 30 creation interface 40 includes a plurality of inputs 42. By way of example and without limitation, the inputs 42 may include cross section nodes selection, trajectory (CAD curve) selection, base components 32 selection, element size, thickness, and disconnect clearance.

To create the new member 30 from an existing member 30, an edge tracking tool is first used to create a 1D mesh for the cross section nodes which were selected by the user to obtain a tracked edge. A sweep tool may be utilized to create a 2D mesh using the tracked edge, trajectory line, and element size to obtain a swept mesh.

The computer system 100 will then create three nodes on the tracked edge, with the first node being at a first end, the second node being in the middle, and the third node being on the second end of the tracked edge. An additional node may be created between the first and third nodes. The computer system 100 may identify the flange for the swept mesh to identify the flange section.

The computer system 100 will then create a morphset, with the control nodes being the flange section, the deformable nodes as "Y" number of adjacent element layers, where Y=(Member 30 Height/Element Size) and member 30 height is equal to the distance between the middle second node and the added fourth node, and the fixed nodes as the $(Y+1)^{th}$ layer to produce the flange morphset as an output.

The flange morphset may be linked. The flange section is projected to the target element (base components 32) along normal direction. The computer system 100 identifies the thickness of the base component 32 and source member 30 (cross section nodes selected). Using an offset tool, the flange section is offset for a value of "A" in normal direction, where A=[(Thickness of base component 32+source member 30 thickness)/2]. The flange morphset is then unlinked and deleted. The swept mesh and flange section are organized to the source member 30 component.

FIG. 3B illustrates creation of a new member 30 from an existing member 30 with disconnected clearance being checked OFF. FIG. 3C illustrates creation of a new member 30 from an existing member 30 with disconnected clearance checked ON.

ii. Joint Creation.

Figure 4A:
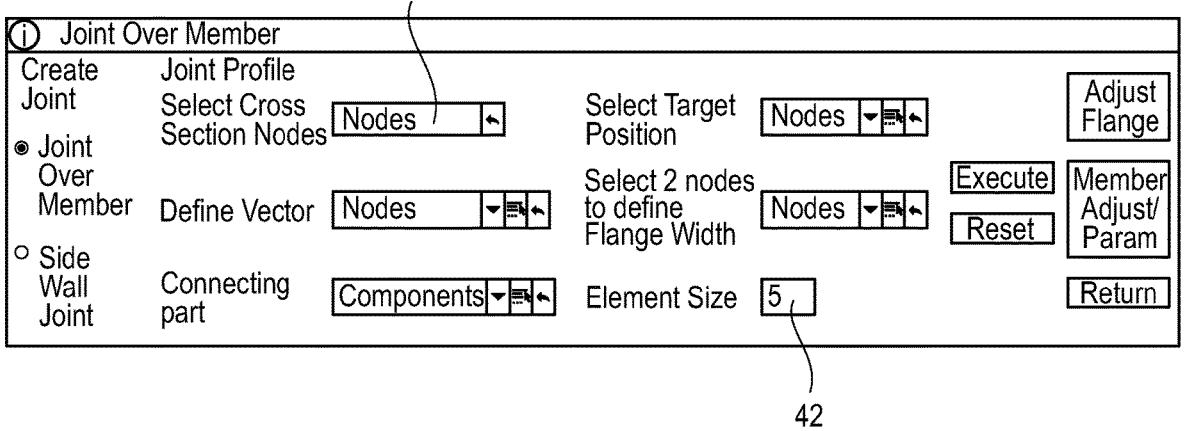
FIG. 4A is a view of an exemplary interface used for creating a joint over member of an automated modelling system in accordance with an example embodiment.
Figure 4B:
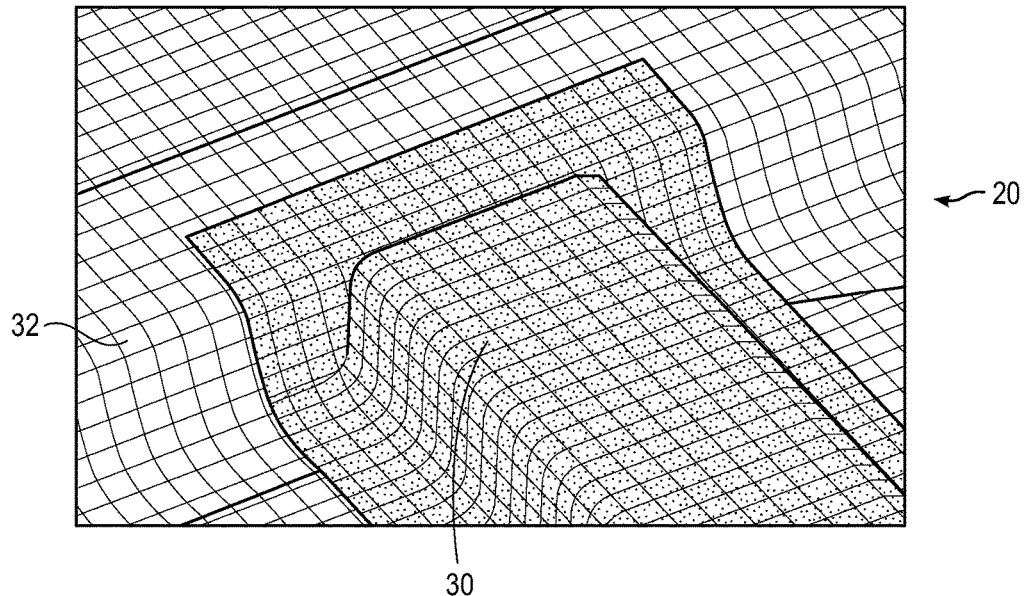
FIG. 4B is a perspective view of a finite element model of a newly-created joint over member of an automated modelling system in accordance with an example embodiment.
Figure 5A:
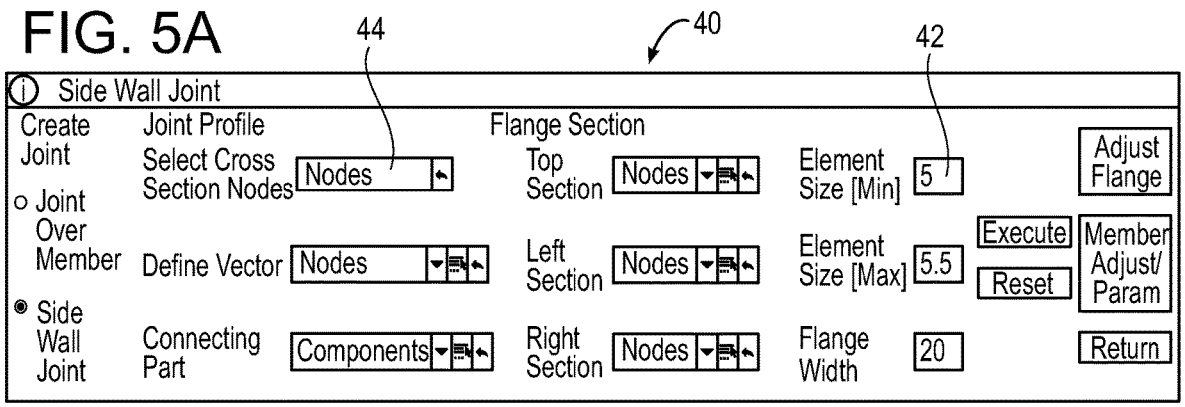
FIG. 5A is a view of an exemplary interface used for creating a side wall joint of an automated modelling system in accordance with an example embodiment.
Figure 5B:
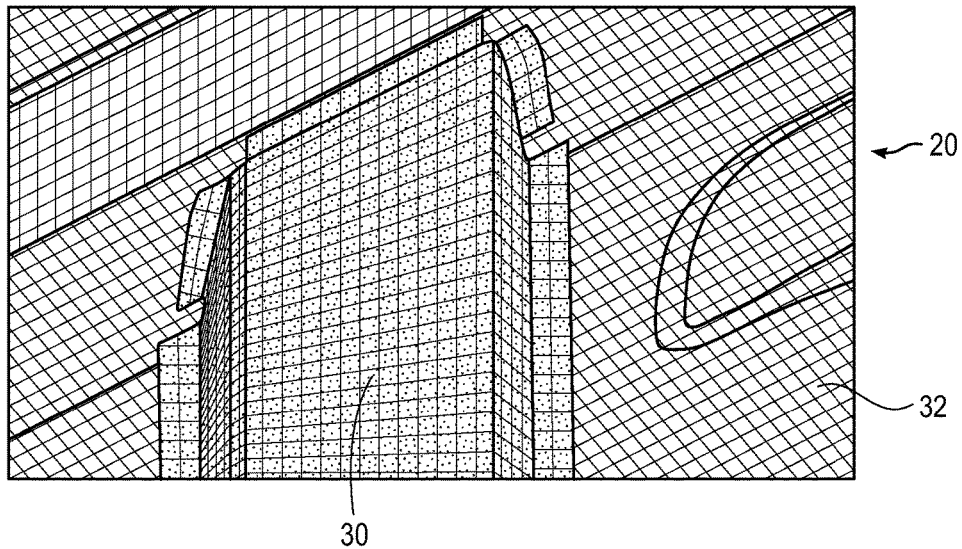
FIG. 5B is a perspective view of a finite element model of a newly-created side wall joint of an automated modelling system in accordance with an example embodiment.

FIGS. 4A, 4B, 5A, and 5B illustrate the creation of joints using the methods and systems described herein. FIGS. 4A and 4B illustrate the creation of a joint over a member 30 and FIGS. 5A and 5B illustrate the creation of a sidewall joint.

As shown in FIG. 4A, an interface 40 may be displayed for the creation of a joint over a member 30, such as by the computer system 100, to be viewed by the user. The interface 40 may comprise a plurality of inputs 42 in which the user may enter data to be processed by the computer system 100 to form the joint over a member 30.

It should be appreciated that the joint over member 30 interface 40 may vary in different embodiments, and thus should not be construed as limited by the exemplary figures. In the exemplary embodiment shown in FIG. 4A, the joint over member 30 interface 40 includes a plurality of inputs 42. By way of example and without limitation, the inputs 42 may include cross section nodes selection, two nodes selection for vector direction, connecting part selection, target position (node) selection, two nodes selection for flange width, and element size.

The manner in which the joint is created over the member 30 may vary in different embodiments. In an exemplary embodiment, a tracked edge is creating by using an edge tracking tool to create 1D mesh for the cross section nodes. Thicnkess of the connecting part and source member 30 (cross section nodes) is identified by the computer system 100. Numerous nodes are created along the tracked edge, including end nodes and a middle node. Additional nodes are created on the end nodes and then translated for differing values based on member 30 height and direction vectors. Further nodes are created and projected to the connecting part along a joint vector to define the normal direction for the side wall of the connecting part.

A morphset is eventually created by the computer system 100, with control nodes being the flange section, deformable nodes as "Y" number of adjacent element layers, with Y=(Member 30 Height/Element Size), and fixed nodes as the $(Y+1)^{th}$ layer. The morphset results in a flange section, which is projected to the target element (connecting part) along normal direction. The flange section may be offset and unlinked. Additional nodes may be created and translated along normal direction and a 2D mesh may be created using various inputs 42, including element size.

Using additional nodes, morphsets, projections, and translations, the new joint may be created over the member 30. FIG. 4B illustrates an exemplary resulting joint having been created over a member 30 using the methods and systems described herein.

As shown in FIG. 5A, an interface 40 may be displayed for the creation of side wall joint, such as by the computer system 100, to be viewed by the user. The interface 40 may comprise a plurality of inputs 42 in which the user may enter data to be processed by the computer system 100 to form the joint over a member 30.

It should be appreciated that the side wall joint interface 40 may vary in different embodiments, and thus should not be construed as limited by the exemplary figures. In the exemplary embodiment shown in FIG. 5A, the side wall joint interface 40 includes a plurality of inputs 42. By way of example and without limitation, the inputs 42 may include cross section nodes selection, vector nodes selection, connecting part selection, member 30 top section nodes selection for flange, member 30 left section nodes selection for flange, member 30 right nodes selection for flange, element size (min), element size (max), and flange width.

With use of the inputs 42 described above, the computer system 100 may be utilized to automate the process of creating a side wall joint. The manner in which the computer system 100 automatically creates the side wall joint with the user-provided inputs 42 may vary in different embodiments. Generally speaking, a 1D mesh is created for the cross section nodes, with the thickness of the connecting part and source member 30 (cross section nodes) being identified. An edge tracking tool may be utilized to create the 1D mesh for the member 30 top section nodes, member 30 left section nodes, and member 30 right section nodes which were selected by the user. Copies of these tracked edges may be created and projected to the connecting part along the joint vector.

A 2D mesh may be created using a ruled mesh tool, using the tracked edges as a first dimension and the copies of the tracked edges as a second dimension, with the element size as an input 42. Additional nodes and tracked edges are created/copied and translated along a direction by a value of the flange width. The ruled mesh tool may be utilized to create 2D meshes of the various tracked edges and tracked edge copies.

Morphsets may then be created with the control nodes comprising the top edge, left edge, and right edge, the deformable nodes comprising ruled meshes, and the fixed nodes comprising copies of the tracked edges. The resulting flange edge morphsets is linked by the computer system 100. Using a project tool, the control nodes may be projected to the target element (connecting part) using, for example, the snap to nearest method. The new edges may be rotated to form the joint. If any intersection is identified between any flanges and the connecting part, then the respective flanges are rotated in anti-clockwise direction. FIG. 5B illustrates an exemplary side wall joint formed using the systems and methods described above.

iii. Customized Member Creation.

Figure 6A:
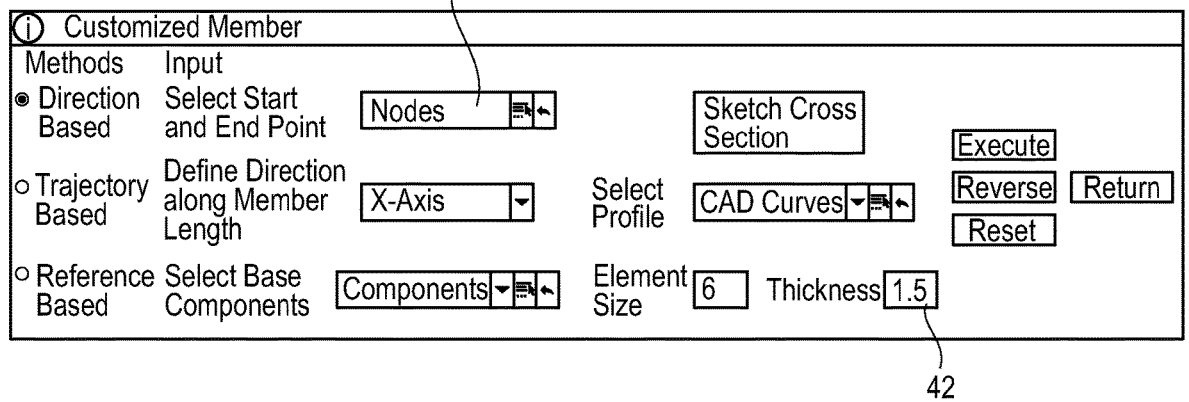
FIG. 6A is a view of an exemplary interface used for creating a direction-based customized member of an automated modelling system in accordance with an example embodiment.
Figure 6B:
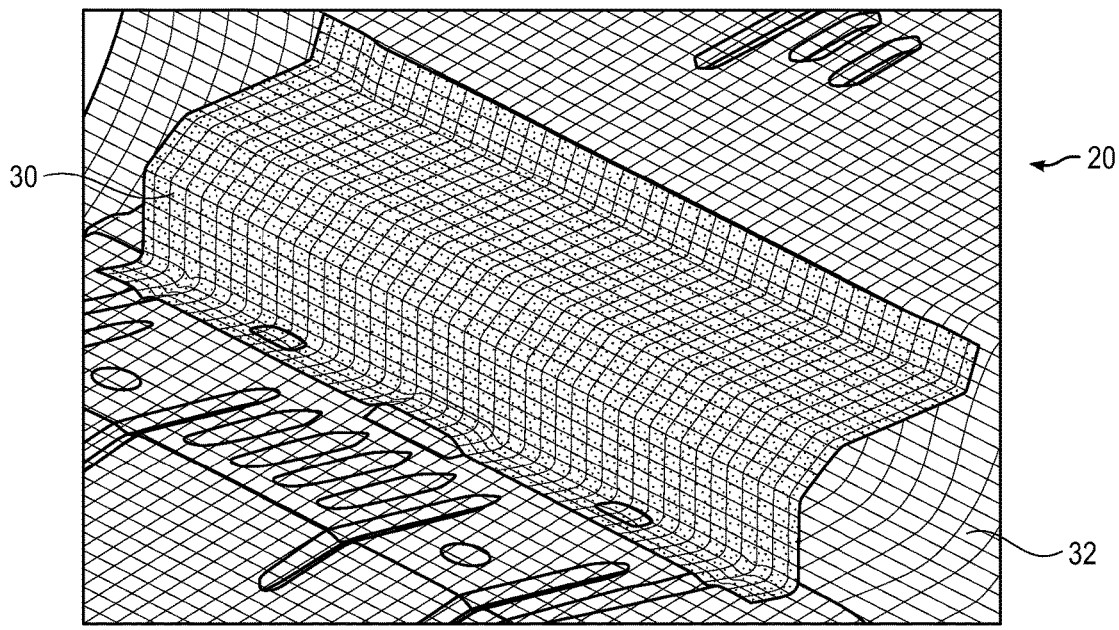
FIG. 6B is a perspective view of a finite element model of a direction-based customized member of an automated modelling system in accordance with an example embodiment.
Figure 7A:
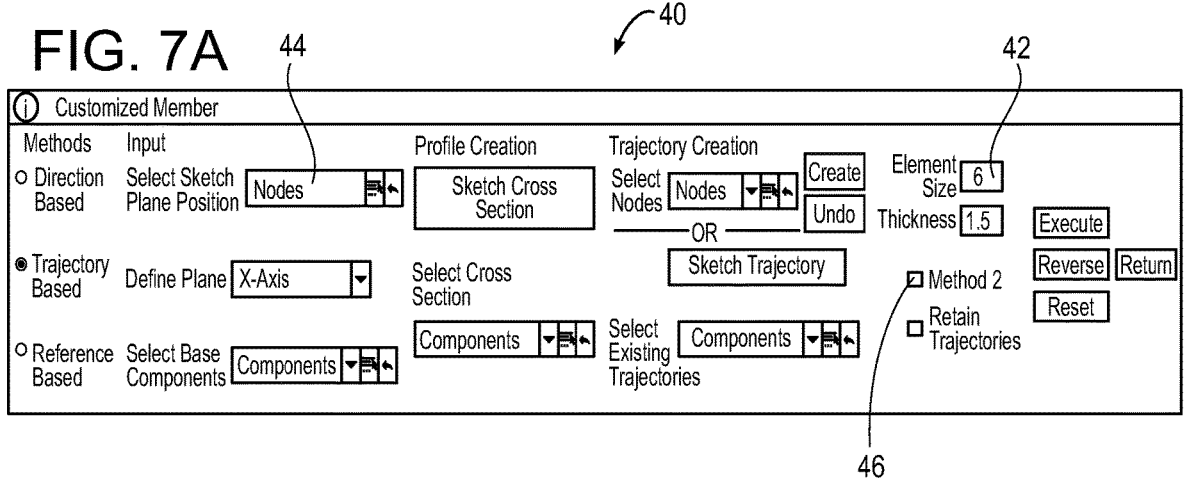
FIG. 7A is a view of an exemplary interface used for creating a trajectory-based customized member of an automated modelling system in accordance with an example embodiment.
Figure 7B:
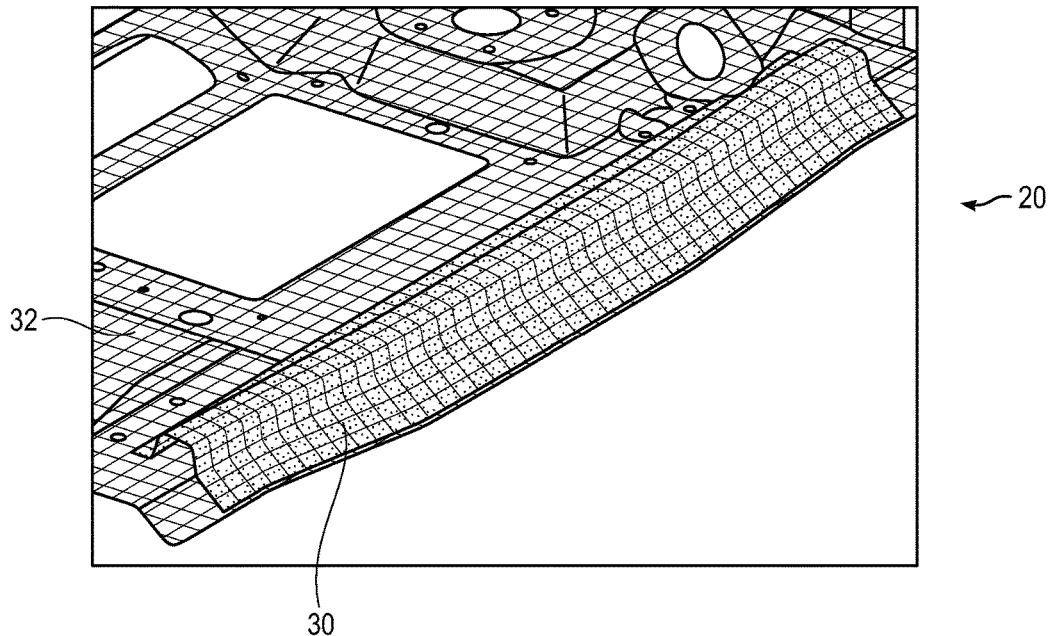
FIG. 7B is a perspective view of a finite element model of a trajectory-based customized member of an automated modelling system in accordance with an example embodiment.
Figure 8A:
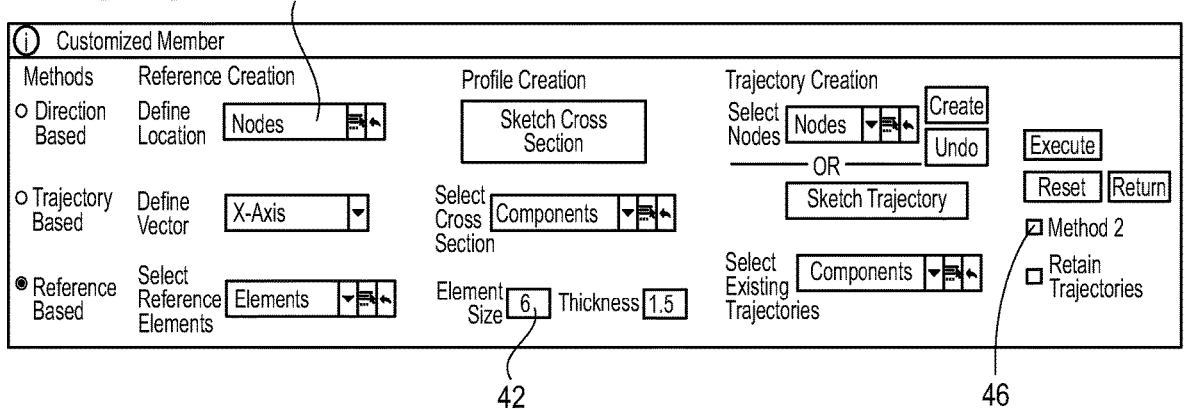
FIG. 8A is a view of an exemplary interface used for creating a reference-based customized member of an automated modelling system in accordance with an example embodiment.
Figure 8B:
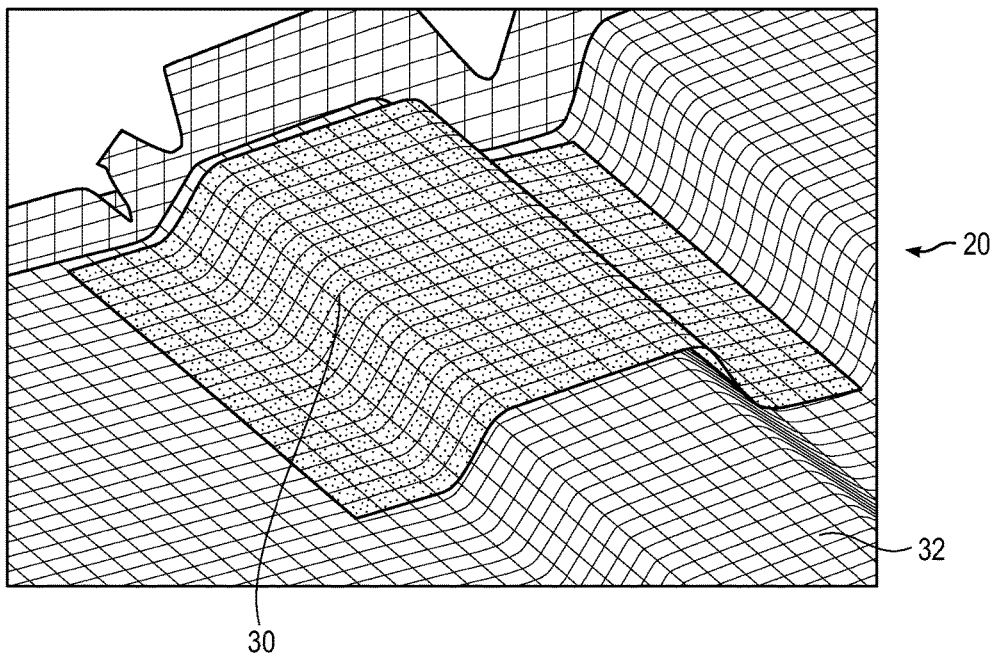
FIG. 8B is a perspective view of a finite element model of a reference-based customized member of an automated modelling system in accordance with an example embodiment.

FIGS. 6A, 6B, 7A, 7B, 8A, and 8B illustrate the automated creation of a customized member 30 based on various user inputs 42. FIGS. 6A and 6B illustrate the automated creation of a direction-based customized member 30. FIGS. 7A and 7B illustrate the automated creation of a trajectory-based customized member 30. FIGS. 8A and 8B illustrate the automated creation of a reference-based customized member 30.

As shown in FIG. 6A, an interface 40 may be displayed for the creation of a direction-based customized member 30, such as by the computer system 100, to be viewed by the user. The interface 40 may comprise a plurality of inputs 42 in which the user may enter data to be processed by the computer system 100 to form customized member 30 based on direction inputs 42.

It should be appreciated that the direction-based customized member 30 interface 40 may vary in different embodiments, and thus should not be construed as limited by the exemplary figures. In the exemplary embodiment shown in FIG. 6A, the direction-based customized member 30 interface 40 includes a plurality of inputs 42. By way of example and without limitation, the inputs 42 may include start and end node selection, direction selection along member 30 length, base component 32 selection, profile selection, element size, and thickness.

With the use of the inputs 42 described above, the computer system 100 may be utilized to automate the process of creating a direction-based customized member 30. The manner in which the computer system 100 automatically creates the direction-based customized member 30 may vary in different embodiments. Generally speaking, a cross section is first sketched with the help of a center node as a start point and direction along member 30 length. The cross section is sketched using CAD lines, or using any of the other methods previously described.

To create the direction-based customized member 30, three nodes are first created: first and second nodes at the start point and a third node at the end point. The second node is translated along member 30 length direction by a value of 10 such that the second node lines between the first and third nodes. A 1D mesh is created on the CAD line (sketched cross section) for the given element size. A 2D mesh is created by taking the 1D cross section, element size, and drag length "A" as an input 42 to obtain dragged mesh as an output.

A flange section may be identified using the identify flange tool to identify the flange of the dragged mesh. The thickness of the base component 32 may also be identified. A morphsets is then created, with the control nodes being the flange section, the deformable nodes being the four adjacent element layers, and the fixed node as the fifth layer. The flange section may then be projected to the target element (base components 32) along normal direction, such as by using the project tool. The flange section may then be offset for a value of "C" in normal direction, where C=[(Thickness of base component 32+Member 30 thickness)/2]. FIG. 6B illustrates an exemplary direction-based member 30 created using the systems and methods described herein with a desired cross section.

As shown in FIG. 7A, an interface 40 may be displayed for the creation of a trajectory-based customized member 30, such as by the computer system 100, to be viewed by the user. The interface 40 may comprise a plurality of inputs 42 in which the user may enter data to be processed by the computer system 100 to form customized members 30 based on trajectory inputs 42.

It should be appreciated that the trajectory-based customized member 30 interface 40 may vary in different embodiments, and thus should not be construed as limited by the exemplary figures. In the exemplary embodiment shown in FIG. 7A, the trajectory-based customized member 30 interface 40 includes a plurality of inputs 42. By way of example and without limitation, the inputs 42 may include sketch plane position selection, direction selection along plane normal, base component 32 selection, cross section selection, trajectory node selection, existing trajectory selection (only if any trajectory already exists), element size, thickness, method selector 46, and retain trajectories selector 46.

With the use of the inputs 42 described above, the computer system 100 may be utilized to automate the process of creating a direction-based customized member 30. The manner in which the computer system 100 automatically creates the direction-based customized member 30 may vary in different embodiments. Generally speaking, a sketch cross section is created using any of the methods previously described.

A 1D mesh is created on the cross section sketched (CAD line) for the given element size. A 2D mesh is created using the sweep tool with the help of the 1D mesh, trajectory line, and element size. If only one trajectory is created or selected, the 2D mesh is created using uniform sweep. If more than one trajectory is created or selected and the method 2 selector 46 is checked OFF, then the 2D mesh is created using the variable sweep and "3D inter." method. If more than one trajectory is created or selected and the method 2 selector 46 is checked ON, then the 2D mesh is created using the variable sweep and "smooth inter." method.

Using the identify flange tool, the flange may be identified in the 2D mesh to separate the flange section as a separate component. The thickness of the base component 32 is identified. A morphsets is created with the control nodes comprising the flange section, the deformable nodes as the four adjacent element layers, and the fixed nodes as the $5^{th}$ layer.

The flange section is then projected to the target element (base components 32) along normal direction. The flange section is offset for a value of "A" in normal direction, where A=[(Thickness of base component 32+Member 30 thickness/2]. The flange morphsets may then unlinked and deleted, with the 2D mesh and flange section organized to the new customized component. FIG. 7B illustrates an exemplary trajectory-based customized member 30 created using the systems and methods described herein.

As shown in FIG. 8A, an interface 40 may be displayed for the creation of a reference-based customized member 30, such as by the computer system 100, to be viewed by the user. The interface 40 may comprise a plurality of inputs 42 in which the user may enter data to be processed by the computer system 100 to form customized members 30 based on reference inputs 42.

It should be appreciated that the reference-based customized member 30 interface 40 may vary in different embodiments, and thus should not be construed as limited by the exemplary figures. In the exemplary embodiment shown in FIG. 8A, the reference-based customized member 30 interface 40 includes a plurality of inputs 42. By way of example and without limitation, the inputs 42 may include reference plane location node selection, direction selection along reference place normal, reference elements selection, cross section selection, trajectory node selection, existing trajectory selection (only if any trajectory already exists), element size, thickness, method 2 selector 46, and retain trajectories selector 46.

With the use of the inputs 42 described above, the computer system 100 may be utilized to automate the process of creating a reference-based customized member 30. The manner in which the computer system 100 automatically creates the reference-based customized member 30 may vary in different embodiments. Generally speaking, a sketch cross section is created using any of the methods previously described. A trajectory may also be created using any number of methods, including by way of example and without limitation extraction from existing FE mesh (intersection), extracting from CAD surface (intersection), user-defined (sketching), importing trajectory lines from external sources in the form of IGES, STEP, PARASOLID, etc., and the like.

A 1D mesh is first created on the cross section for the given element size. Using the sweep tool, a 2D mesh is created with use of the 1D mesh, the trajectory line, and the element size. If only one trajectory is created or selected, the 2D mesh is created using uniform sweep. If more than one trajectory is created or selected and the method 2 selector 46 is checked OFF, then the 2D mesh is created using the variable sweep and "3D inter." method. If more than one trajectory is created or selected and the method 2 selector 46 is checked ON, then the 2D mesh is created using the variable sweep and "smooth inter." method. If retain trajectories is checked ON, then the trajectories created or selected will not be deleted. If retain trajectories is checked OFF, then the trajectories will be deleted. FIG. 8B illustrates an exemplary reference-based customized member 30 created using the systems and methods described herein.

Figure 9A:
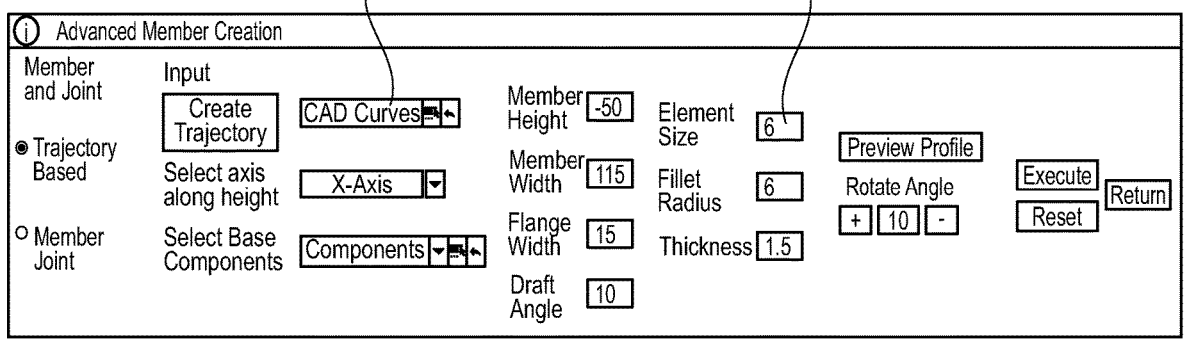
FIG. 9A is a view of an exemplary interface used for creating an advanced trajectory-based customized member of an automated modelling system in accordance with an example embodiment.

As shown in FIG. 9A, an interface 40 may be displayed for the advanced creation of a trajectory-based customized member 30, such as by the computer system 100, to be viewed by the user. The interface 40 may comprise a plurality of inputs 42 in which the user may enter data to be processed by the computer system 100 to form advanced customized members 30 based on trajectory inputs 42.

It should be appreciated that the trajectory-based advanced customized member 30 interface 40 may vary in different embodiments, and thus should not be construed as limited by the exemplary figures. In the exemplary embodiment shown in FIG. 9A, the advanced trajectory-based customized member 30 interface 40 includes a plurality of inputs 42. By way of example and without limitation, the inputs 42 may include trajectory (CAD curve) selection, axis along height selection, base components 32 selection, member 30 height, member 30 width, flange width, draft angle, element size, fillet radius, thickness, and rotate angle.

Figure 9B:
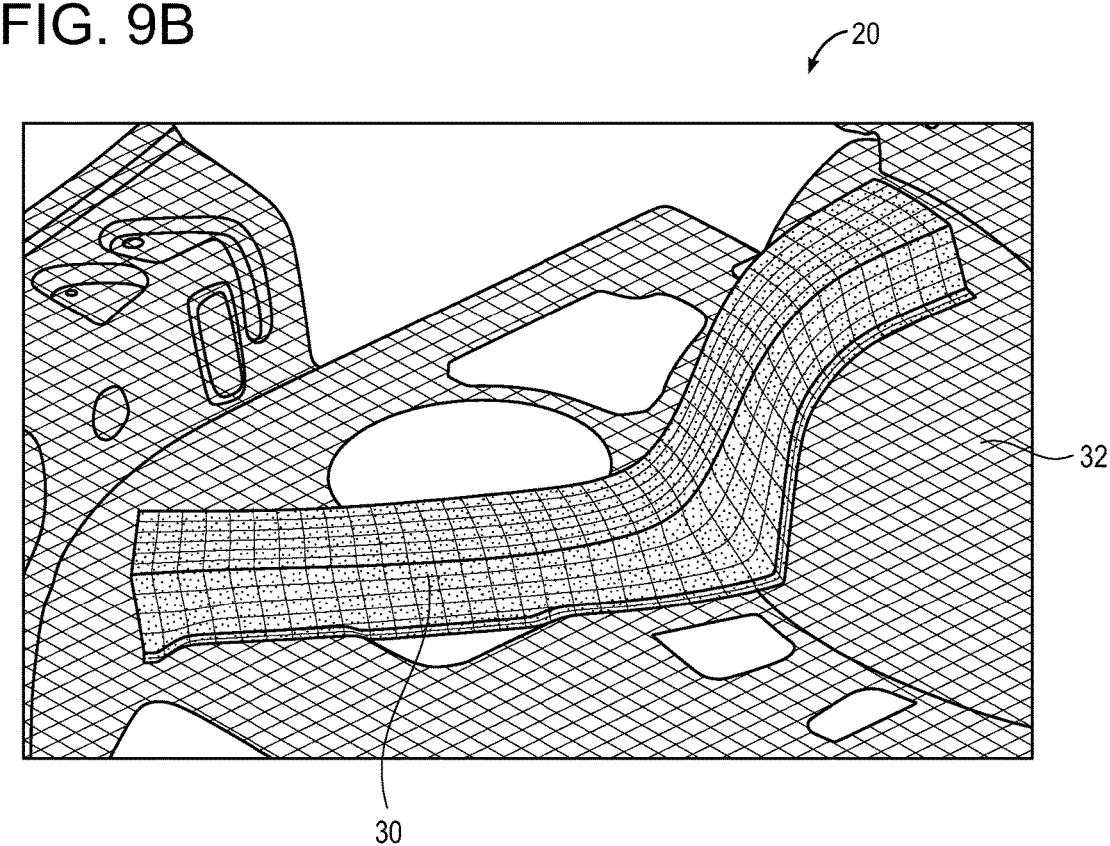
FIG. 9B is a perspective view of a finite element model of an advanced trajectory-based customized member of an automated modelling system in accordance with an example embodiment.

With the use of the inputs 42 described above, the computer system 100 may be utilized to automate the process of creating an advanced trajectory-based customized member 30. The type of trajectory may be chosen by the user at the trajectory selection input 42, with the embodiment of FIG. 9B illustrating usage of CAD curves. The select axis along height input 42 may be utilized to select an axis, with the illustrated embodiment showing usage of the X-Axis. A base component 32 may also be selected.

The remaining inputs 42 shown in FIG. 9A relate to inputs 42 provided by the user which the computer system 100 will utilize to form the advanced trajectory-based customized member 30. The member 30 height, member 30 width, flange width, draft angle, element size, fillet radius, and thickness may be set by the user. With the information from the preceding inputs 42 entered, the computer system 100 may complete the automated process of creating the customized member 30. FIG. 9B illustrates an advanced customized member 30 which has been created automatically by the computer system 100 based on inputs 42 from the user.

Figure 10A:
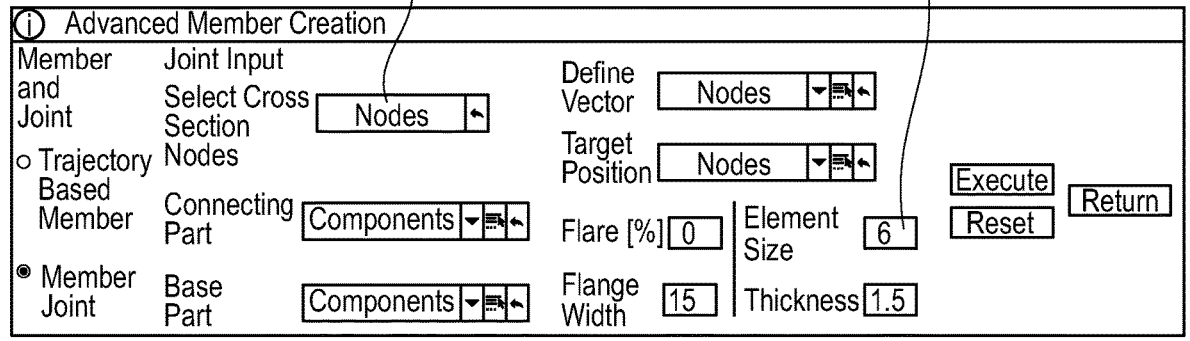
FIG. 10A is a view of an exemplary interface used for creating an advanced member joint of an automated modelling system in accordance with an example embodiment.

As shown in FIG. 10A, an interface 40 may be displayed for the advanced creation of a member 30 joint, such as by the computer system 100, to be viewed by the user. The interface 40 may comprise a plurality of inputs 42 in which the user may enter data to be processed by the computer system 100 to form the member 30 joint.

It should be appreciated that the member 30 joint interface 40 may vary in different embodiments, and thus should not be construed as limited by the exemplary figures. In the exemplary embodiment shown in FIG. 10A, the member 30 joint interface 40 includes a plurality of inputs 42. By way of example and without limitation, the inputs 42 may include cross section nodes selection, connecting parts selection, base part selection, two nodes selection for vector direction, target position (node) selection, flare percentage, flange width, element size, and thickness.

Figure 10B:
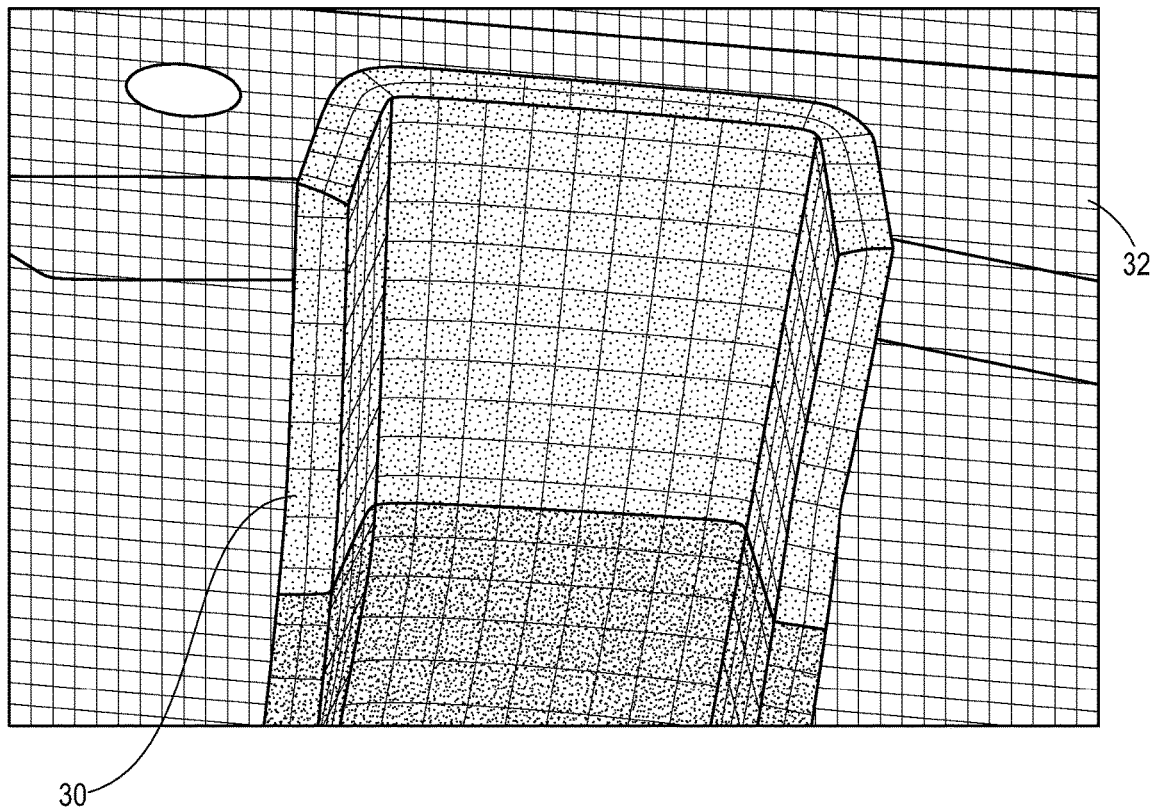
FIG. 10B is a perspective view of a finite element model of an advanced member joint of an automated modelling system in accordance with an example embodiment.

With the use of the inputs 42 described above, the computer system 100 may be utilized to automate the process of creating a member 30 joint. The user may identify the cross section nodes, connecting part, base part, vector direction, and target position. The user may also provide, via the interface 40, a flare percentage, flange width, element size, and thickness. With the information provided by the user via the inputs 42 of the interface 40, the computer system may complete the automated process of creating the member 30 joint. FIG. 10B illustrates a member 30 joint which has been created automatically by the computer system 100 based on inputs 42 from the user.

Figure 11A:
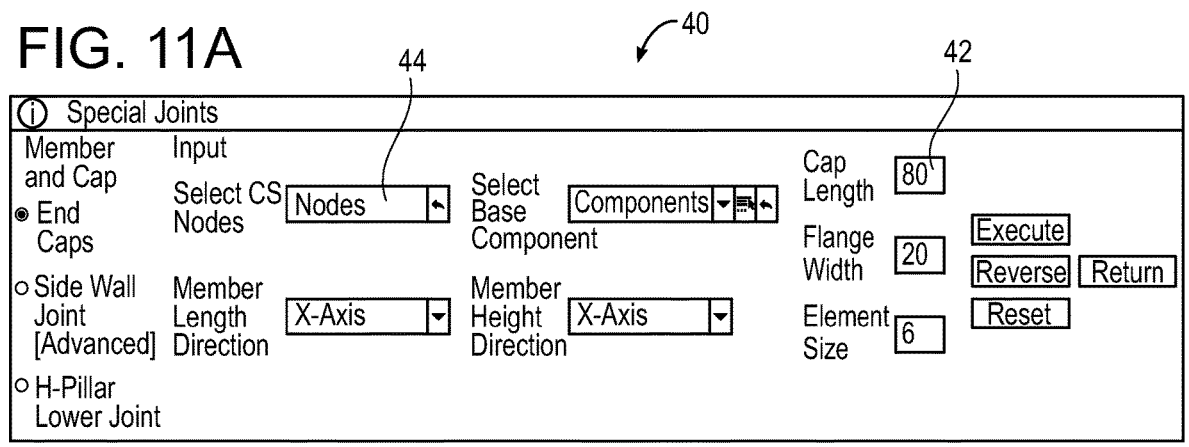
FIG. 11A is a view of an exemplary interface used for creating end caps of an automated modelling system in accordance with an example embodiment.

The systems and methods described herein may also be utilized to automatically create various types of special joints, by the computer system 100, based on inputs 42 provided by the user. FIG. 11A illustrates an exemplary interface 40 which may be displayed for the automated creation of a special joint comprised of an end cap, such as by the computer system 100, to be viewed by the user. The interface 40 may comprise a plurality of inputs 42 in which the user may enter data to be processed by the computer system 100 to form the end caps.

It should be appreciated that the special joints interface 40 used to create the end caps may vary in different embodiments, and thus should not be construed as limited by the exemplary figures. In the exemplary embodiment shown in FIG. 11A, the special joints interface 40 for end caps includes a plurality of inputs 42. By way of example and without limitation, the inputs 42 may include cross section nodes selection, member 30 length direction selection, base component 32 selection, member 30 height direction selection, cap length, flange width, and element size.

Figure 11B:
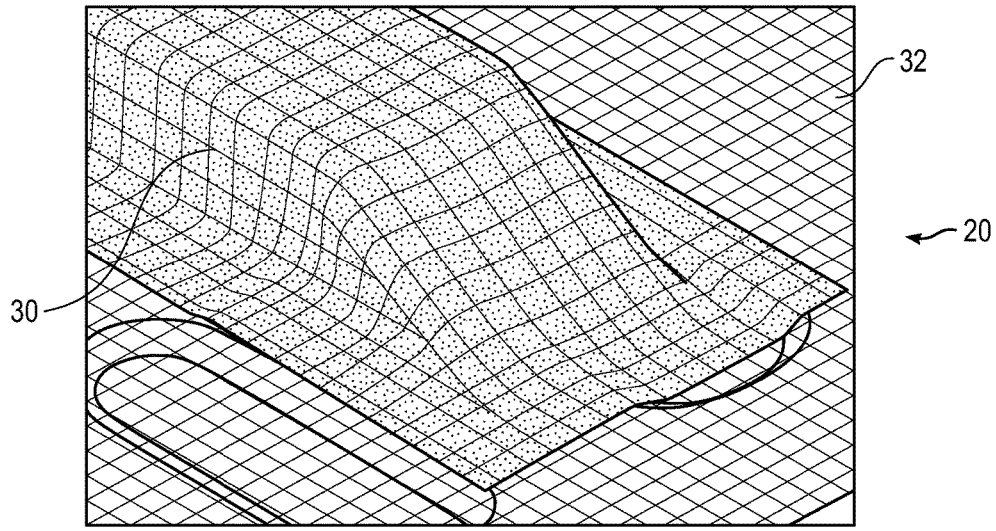
FIG. 11B is a perspective view of a finite element model of an end cap of an automated modelling system in accordance with an example embodiment.

With the use of the inputs 42 described above, the computer system 100 may be utilized to automatically create end caps based on limited user inputs 42. As shown in FIG. 11A, a user may select cross section nodes, member 30 length direction, base components 32, and member 30 height direction utilizing the drop-downs of the interface 40. The user may then enter the cap length, flange width, and element size. With these inputs 42, the computer system 100 will automatically create the end caps in the finite element model 20 and display to the user. FIG. 11B illustrates an exemplary end cap which has been created automatically by the computer system 100 based on inputs 42 from the user.

Figure 12A:
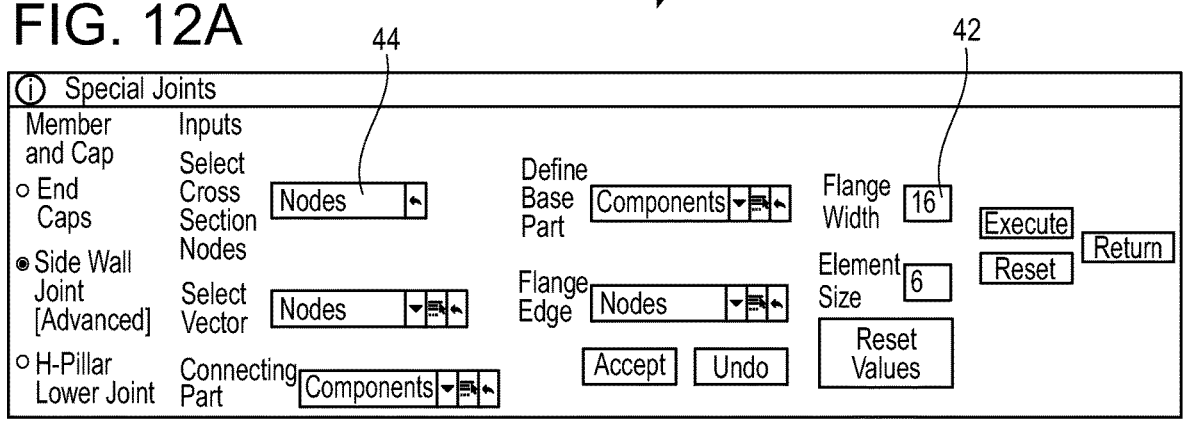
FIG. 12A is a view of an exemplary interface used for creating side wall joints of an automated modelling system in accordance with an example embodiment.

FIG. 12A illustrates an exemplary interface 40 which may be displayed for the automated creation of a special joint comprised of an advanced side wall joint, such as by the computer system 100, to be viewed by the user. The interface 40 may comprise a plurality of inputs 42 in which the user may enter data to be processed by the computer system 100 to form the side wall joint.

It should be appreciated that the special joints interface 40 used to create the side wall joint may vary in different embodiments, and thus should not be construed as limited by the exemplary figures. In the exemplary embodiment shown in FIG. 12A, the special joints interface 40 for side wall joints includes a plurality of inputs 42. By way of example and without limitation, the inputs 42 may include cross section nodes selection, two nodes selection for vector direction, connecting part selection, base part selection, nodes selection for flange edge, flange width, and element size.

Figure 12B:
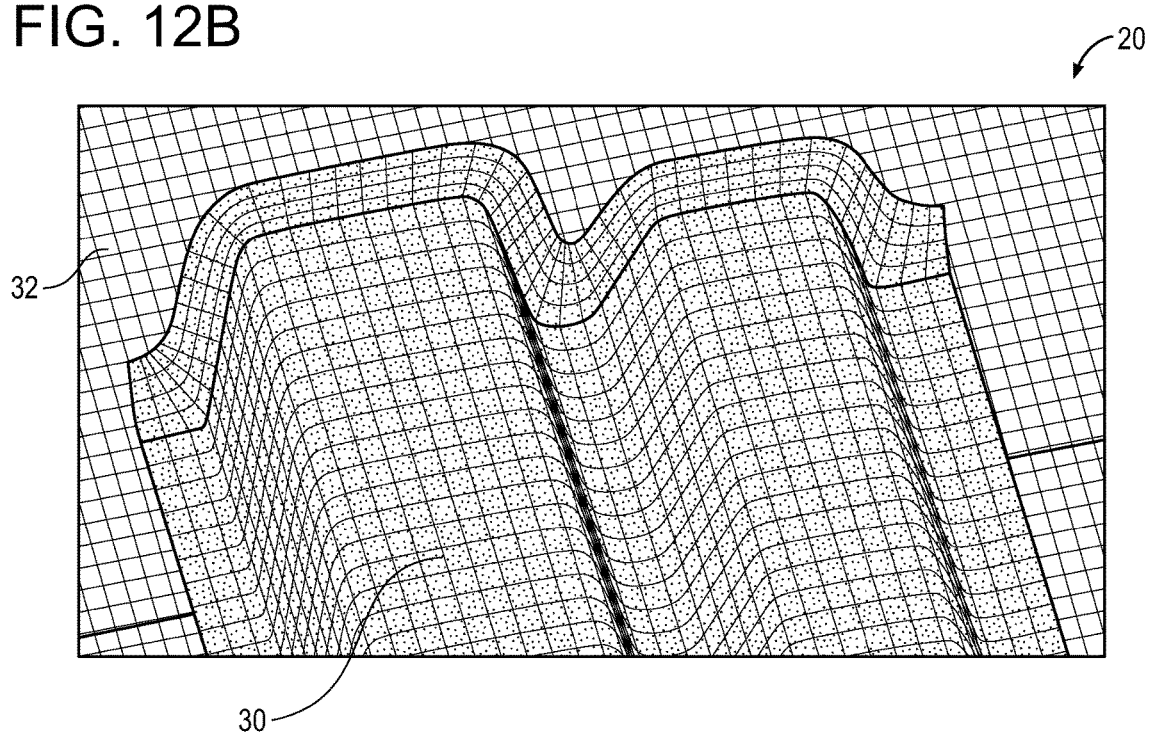
FIG. 12B is a perspective view of a finite element model of a side wall joint of an automated modelling system in accordance with an example embodiment.

With the use of the inputs 42 described above, the computer system 100 may be utilized to automatically create the side wall joint. As shown in FIG. 12A, a user may select cross section nodes and vector direction by dropdown 44. Similarly, the user may identify any connecting parts, base parts, and flange edge using dropdowns 44 in the interface 40. The flange width and element size may be manually entered by the user. With these inputs 42, the computer system 100 will automatically create the side wall joint in the finite element model 20 and display to the user. FIG. 12B illustrates an exemplary side wall joint created automatically by the computer system 100 based on inputs 42 from the user.

Figure 13A:
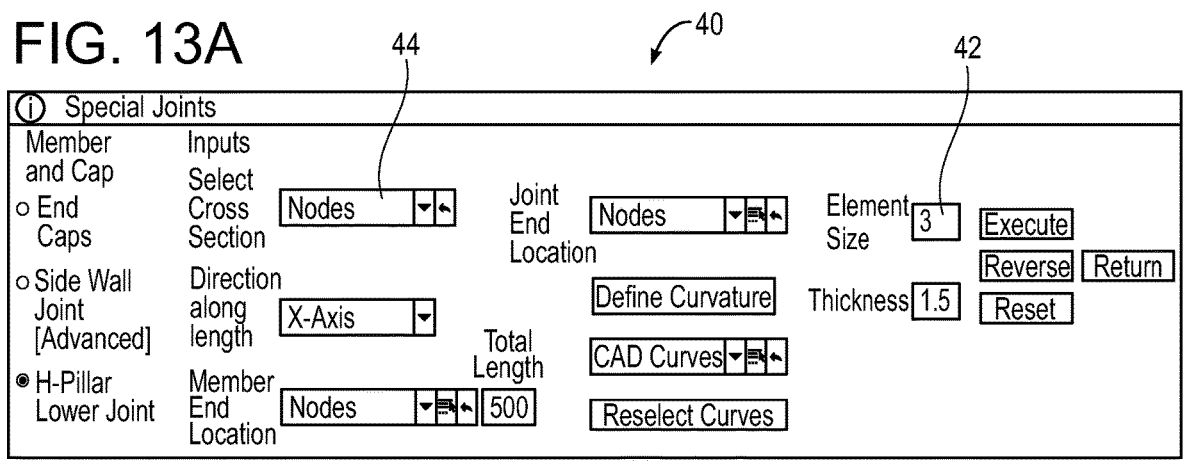
FIG. 13A is a view of an exemplary interface used for creating H-pillar lower joints of an automated modelling system in accordance with an example embodiment.

FIG. 13A illustrates an exemplary interface 40 which may be displayed for the automated creation of a special joint comprised of an H-pillar lower joint, such as by the computer system 100, to be viewed by the user. The interface 40 may comprise a plurality of inputs 42 in which the user may enter data to be processed by the computer system 100 to form the H-pillar lower joint.

It should be appreciated that the special joints interface 40 used to create the H-pillar lower joint may vary in different embodiments, and thus should not be construed as limited by the exemplary figures. In the exemplary embodiment shown in FIG. 13A, the special joints interface 40 for H-pillar lower joints includes a plurality of inputs 42. By way of example and without limitation, the inputs 42 may include cross section selection, direction along length, member 30 end location selection, joint end location selection, trajectory CAD curves selection, element size, and thickness.

It should be appreciated that, like with the other methods described herein, the cross section selection options may vary. In the exemplary embodiments described herein, the cross section selection may comprise use of nodes, 1D, or CAD curve. In the exemplary embodiment shown in FIG. 13A, nodes have been selected for the cross section.

Figure 13B:
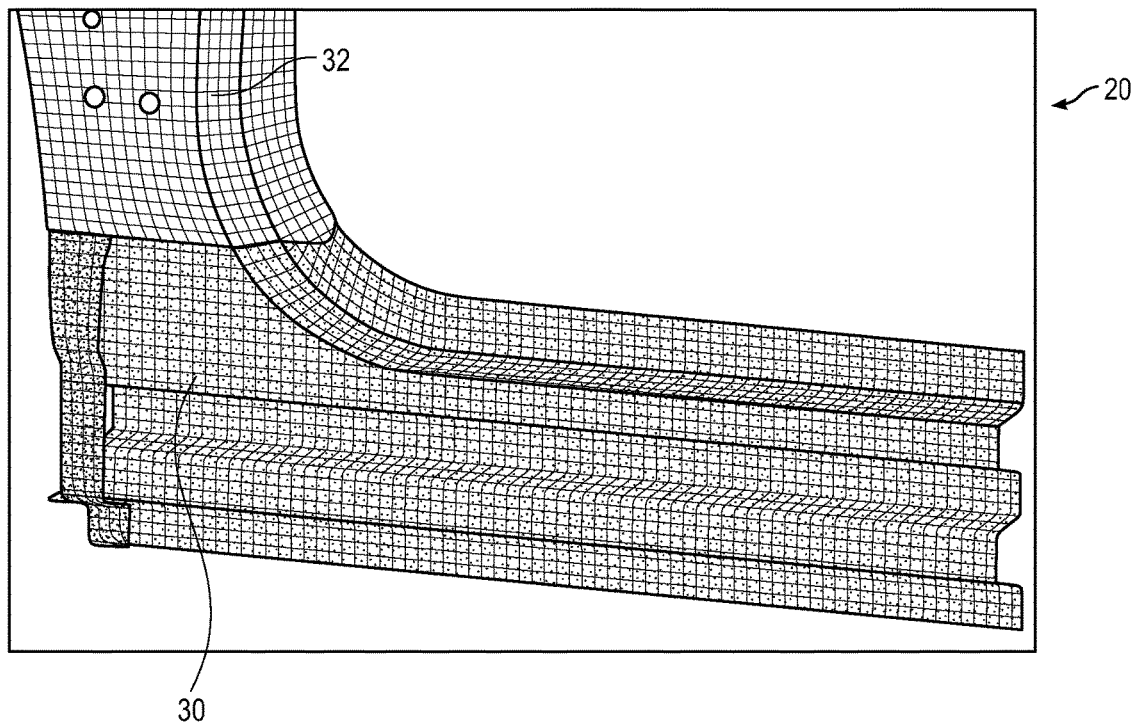
FIG. 13B is a perspective view of a finite element model of an H-pillar lower joint of an automated modelling system in accordance with an example embodiment.

The user may also select an axis for direction along length and a member 30 end location along with total length. The joint end location is also selected and curvature may be defined. The element size and thickness may be manually entered by the user via the interface 40. With the use of the inputs 42 described above, the computer system 100 may be utilized to automatically form an H-pillar lower joint in the finite element model 20 and display to the user. FIG. 13B illustrates an exemplary H-pillar lower joint created automatically by the computer system 100 based on inputs 42 from the user.

iv. Inner Part Design.

FIGS. 14A, 14B, 15A, 15B, 16A, 16B, 17A, 17B, 18A, 18B, 18C, 19A, and 19B illustrate methods and systems for use in creating various inner parts. As shown throughout the figures, various interfaces 40 may be provided with which a user may provide data inputs 42 for the computer system 100 to automatically create various types of inner parts, including an A-pillar, roof rail, header, roof bow, header bow, and B-pillar. It should be appreciated that various other types of inner parts, particularly for automobiles, may be supported by the systems and methods described herein.

Figure 14A:
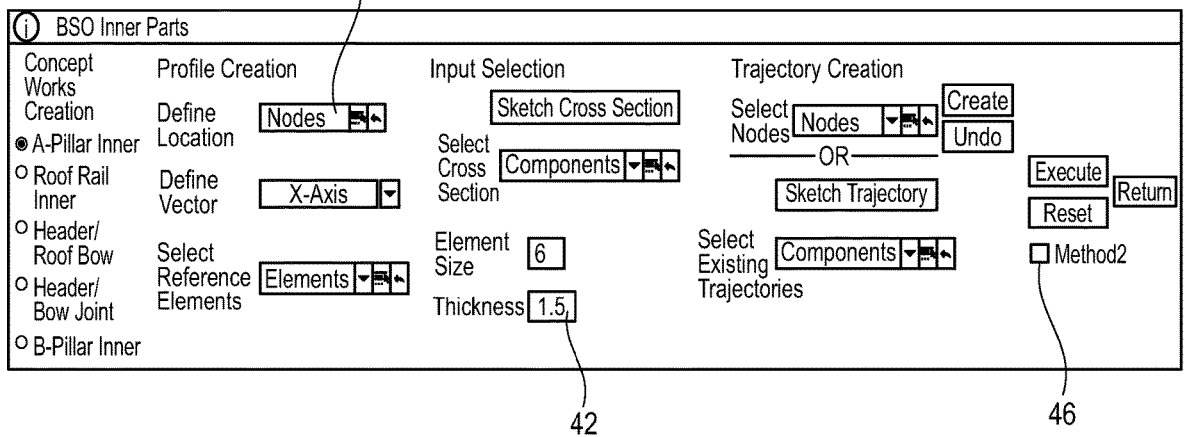
FIG. 14A is a view of an exemplary interface used for creating A-pillar inner parts of an automated modelling system in accordance with an example embodiment.

FIG. 14A illustrates an exemplary interface 40 which may be used by the user to input 42 data to be processed by the computer system 100 in automatically creating an A-pillar inner part. The interface 40 may comprise a plurality of inputs 42 in which the user may enter data or information to be processed by the computer system 100 to form the A-pillar inner part.

It should be appreciated that the A-pillar interface 40 used to create the A-pillar may vary in different embodiments, and thus should not be construed as limited by the exemplary figures. In the exemplary embodiment shown in FIG. 14A, the inner parts interface 40 for A-pillars includes a plurality of inputs 42. By way of example and without limitation, the inputs 42 may include reference place location node selection, direction selection along reference plane normal, reference elements selection, trajectory node selection, existing trajectory selection (if any trajectory already exists), element size, thickness, and method selection.

Figure 14B:
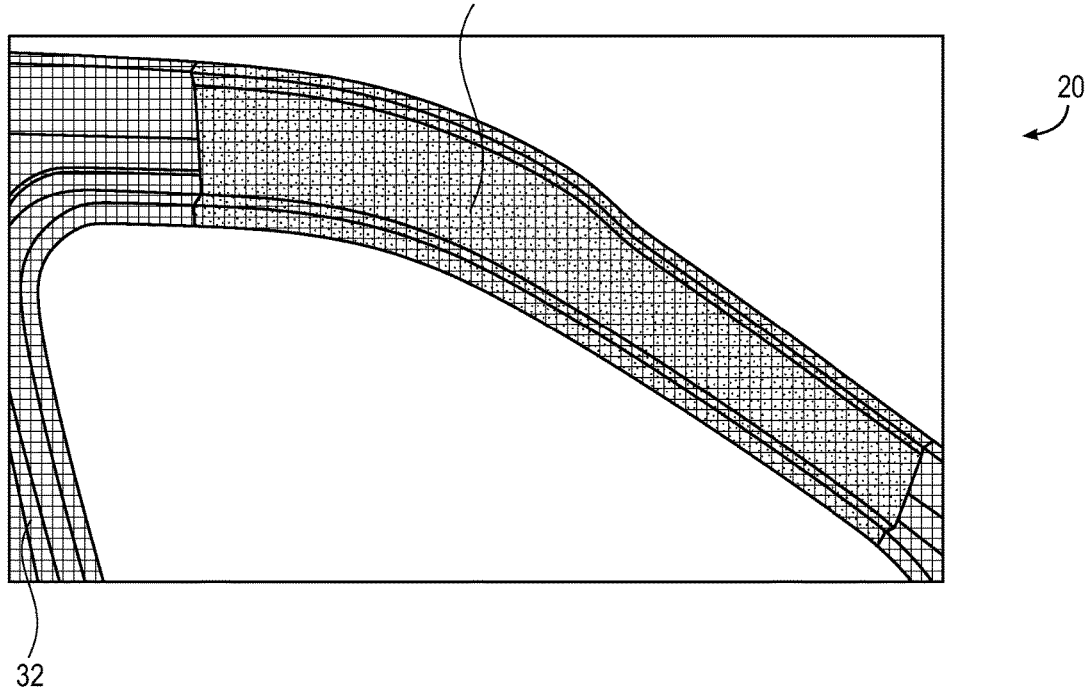
FIG. 14B is a perspective view of a finite element model of an A-pillar inner part of an automated modelling system in accordance with an example embodiment.

With the use of the inputs 42 described above, the computer system 100 may be utilized to automatically create the A-pillar. The user may first use dropdowns 44 to define location, vector direction, and reference elements. The user may select the cross section input 42, such as by sketching. Element size and thickness may be manually entered. The trajectory may also be defined and selected, such as by nodes or sketching. Any existing trajectories are identified. The method selection may be utilized to select between the method used to create the 2D mesh. FIG. 14B illustrates an exemplary A-pillar which has been created automatically by the computer system 100 based on inputs 42 from the user.

Figure 15A:
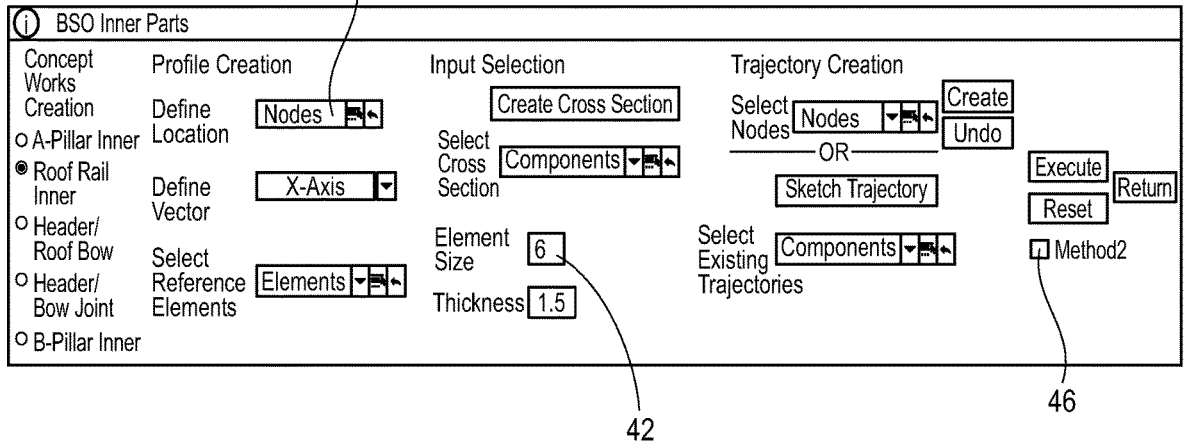
FIG. 15A is a view of an exemplary interface used for creating a roof rail of an automated modelling system in accordance with an example embodiment.

FIG. 15A illustrates an exemplary interface 40 which may be used by the user to input 42 data to be processed by the computer system 100 in automatically creating a roof rail inner part. The interface 40 may comprise a plurality of inputs 42 in which the user may enter data or information to be processed by the computer system 100 to form the roof rail inner part.

It should be appreciated that the inner parts interface 40 used to create the roof rail may vary in different embodiments, and thus should not be construed as limited by the exemplary figures. In the exemplary embodiment shown in FIG. 15A, the inner parts interface 40 for roof rail creation includes a plurality of inputs 42. By way of example and without limitation, the inputs 42 may include reference place location node selection, direction selection along reference plane normal, reference elements selection, trajectory node selection, existing trajectory selection (if any trajectory already exists), element size, thickness, and method selection.

Figure 15B:
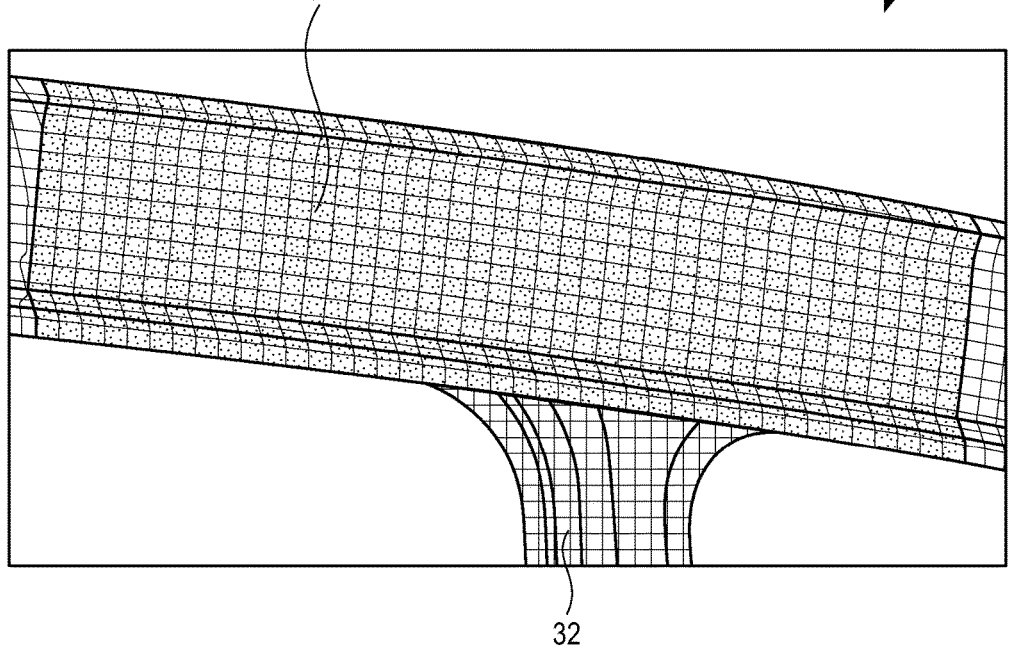
FIG. 15B is a perspective view of a finite element model of roof rail of an automated modelling system in accordance with an example embodiment.

With the use of the inputs 42 described above, the computer system 100 may be utilized to automatically create the roof fail. The user may first use dropdowns 44 to define location, vector direction, and reference elements. The user may select the cross section input 42, such as by sketching. Element size and thickness may be manually entered. The trajectory may also be defined and selected, such as by nodes or sketching. Any existing trajectories are identified. The method selection may be utilized to select between the methods used to create the 2D mesh. FIG. 15B illustrates an exemplary roof rail which has been created automatically by the computer system 100 based on inputs 42 from the user.

Figure 16A:
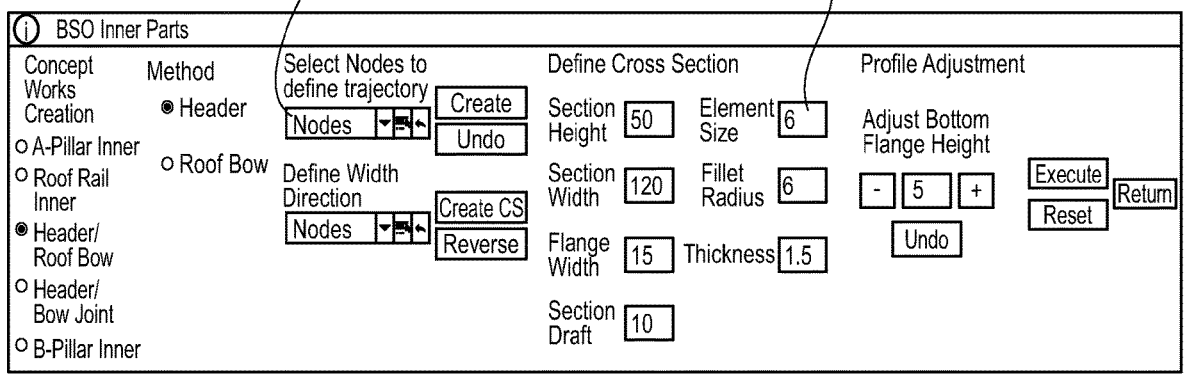
FIG. 16A is a view of an exemplary interface used for creating a header of an automated modelling system in accordance with an example embodiment.

FIG. 16A illustrates an exemplary interface 40 which may be used by the user to input 42 data to be processed by the computer system 100 in automatically creating a header inner part. The interface 40 may comprise a plurality of inputs 42 in which the user may enter data or information to be processed by the computer system 100 to form the header inner part.

It should be appreciated that the inner parts interface 40 used to create the header may vary in different embodiments, and thus should not be construed as limited by the exemplary figures. In the exemplary embodiment shown in FIG. 16A, the inner parts interface 40 for header creation includes a plurality of inputs 42. By way of example and without limitation, the inputs 42 may include trajectory nodes selection, width direction nodes, section height, section width, flange width, section draft, element size, fillet radius, adjust bottom flange height, and thickness.

Figure 16B:
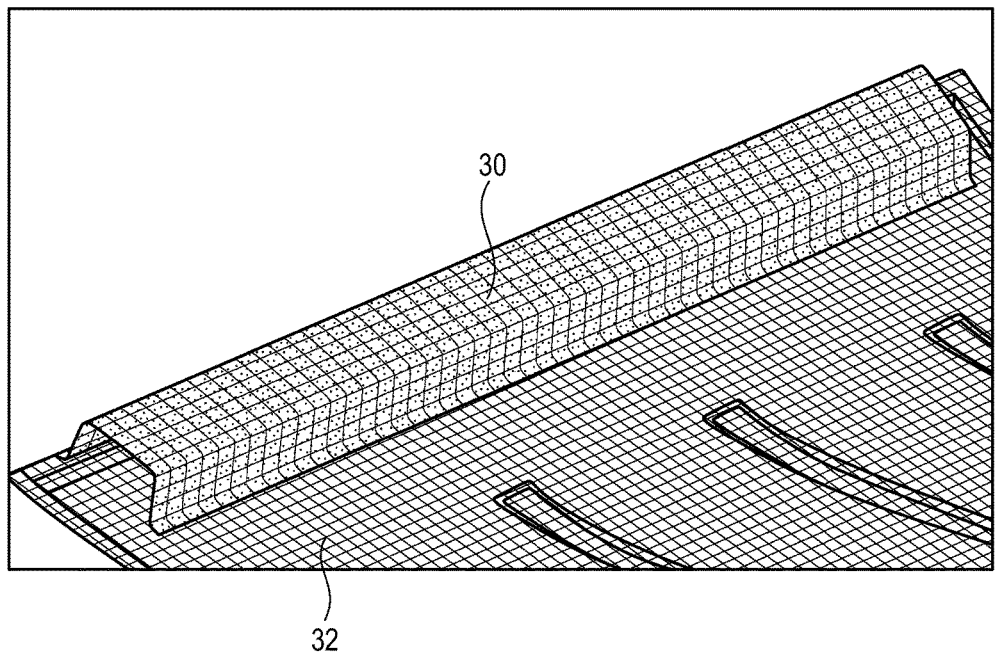
FIG. 16B is a perspective view of a finite element model of a header of an automated modelling system in accordance with an example embodiment.

With the use of the inputs 42 described above, the computer system 100 may be utilized to automatically create an inner part comprised of a header. Nodes may be selected/created to define the trajectory. The width direction nodes may also be selected and, if desired, reversed. The user may then manually enter the section height, section width, flange width, section draft, element size, fillet radius, and thickness. The user may adjust the bottom flange height as desired in increments. The computer system 100 will use the selections and inputs 42 made by the user to automatically process and create the header in the finite element model 20. FIG. 16B illustrates an exemplary header which has been created automatically by the computer system 100 based on inputs 42 and selections from the user.

Figure 17A:
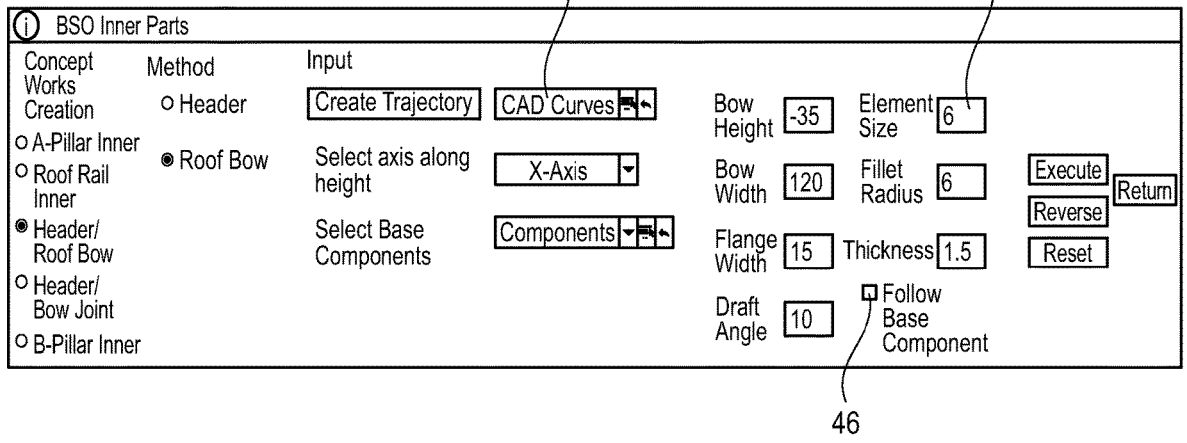
FIG. 17A is a view of an exemplary interface used for creating a roof bow of an automated modelling system in accordance with an example embodiment.

FIG. 17A illustrates an exemplary interface 40 which may be used by the user to input 42 data to be processed by the computer system 100 in automatically creating a roof bow inner part. The interface 40 may comprise a plurality of inputs 42 in which the user may enter data or information to be processed by the computer system 100 to form the roof bow inner part.

It should be appreciated that the inner parts interface 40 used to create the roof bow may vary in different embodiments, and thus should not be construed as limited by the exemplary figures. In the exemplary embodiment shown in FIG. 17A, the inner parts interface 40 for roof bow creation includes a plurality of inputs 42. By way of example and without limitation, the inputs 42 may include trajectory selection, axis along height selection, base components 32 selection, bow height, bow width, flange width, draft angle, element size, fillet radius, thickness, and follow base component 32 selector 46.

Figure 17B:
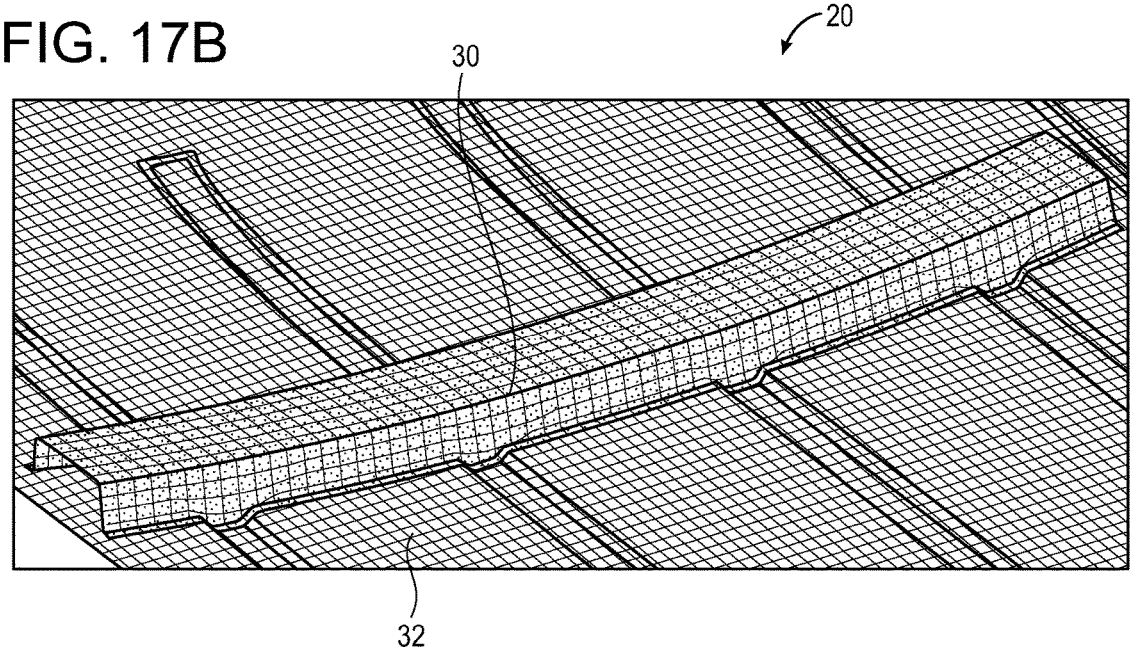
FIG. 17B is a perspective view of a finite element model of a roof bow of an automated modelling system in accordance with an example embodiment.

With the use of the inputs 42 described above, the computer system 100 may be utilized to automatically create the roof bow. The user may select or create a trajectory using any of the methods previously described, with the exemplary embodiment in the figure illustrating usage of CAD curves. The user may also use dropdowns 44 to select the axis along height and any base components 32. The user may then manually enter data for the bow height, bow width, flange width, draft angle, element size, fillet radius, and thickness. If it is desired for the roof bow to follow a base component 32, the follow base component 32 selector 46 may be checked ON. FIG. 17B illustrates an exemplary roof bow which has been created automatically by the computer system 100 based on inputs 42 and selections from the user.

Figure 18A:
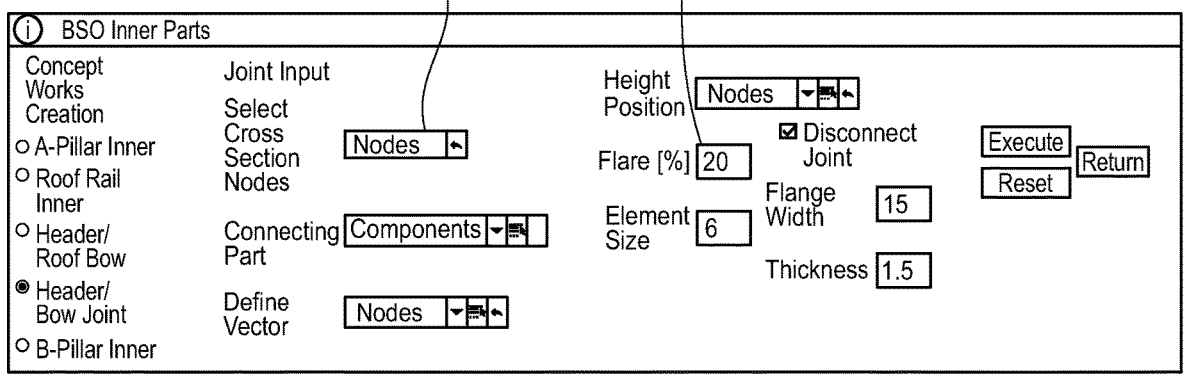
FIG. 18A is a view of an exemplary interface used for creating a header bow joint of an automated modelling system in accordance with an example embodiment.

FIG. 18A illustrates an exemplary interface 40 which may be used by the user to input 42 data to be processed by the computer system 100 in automatically creating a header or bow joint inner part. The interface 40 may comprise a plurality of inputs 42 in which the user may enter data or information to be processed by the computer system 100 to form the header or bow joint inner part.

It should be appreciated that the inner parts interface 40 used to create the header or bow joint may vary in different embodiments, and thus should not be construed as limited by the exemplary figures. In the exemplary embodiment shown in FIG. 18A, the inner parts interface 40 for header/bow joint creation includes a plurality of inputs 42. By way of example and without limitation, the inputs 42 may include cross section nodes selection, connecting part selection, two nodes selection for vector direction, height position selection, disconnect joint selector 46, flare percentage, flange width, element size, and thickness.

With the use of the inputs 42 described above, the computer system 100 may be utilized to automatically create the header/bow joint. The user may select or create a cross section using any of the methods previously described, with the exemplary embodiment in the figure illustrating usage of nodes. The user may select connecting parts, vector direction, and height position. The joint may be selected to be disconnected or not using the disconnect joint selector 46. The user may manually enter flare percentage, flange width, element size, and thickness.

Figure 18B:
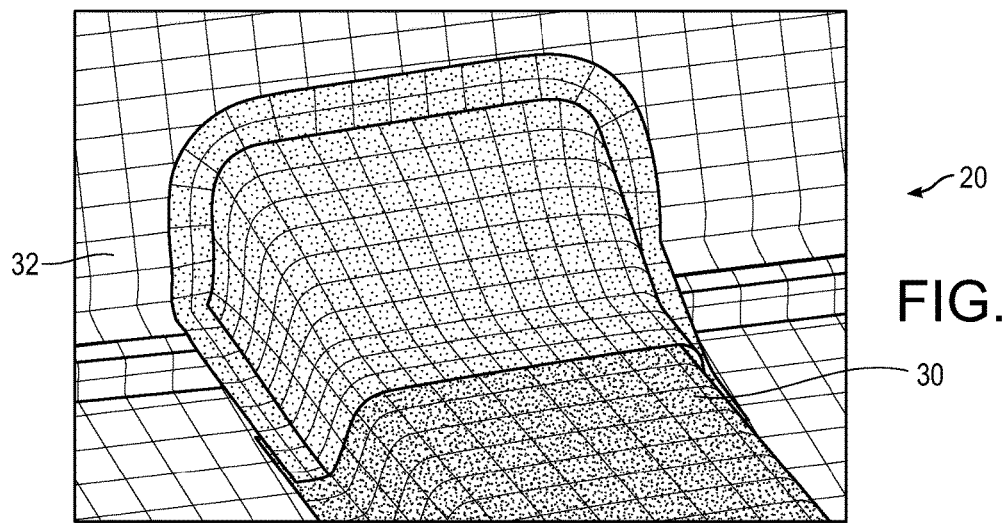
FIG. 18B is a perspective view of a finite element model of a header bow joint with disconnect joint checked on of an automated modelling system in accordance with an example embodiment.
Figure 18C:
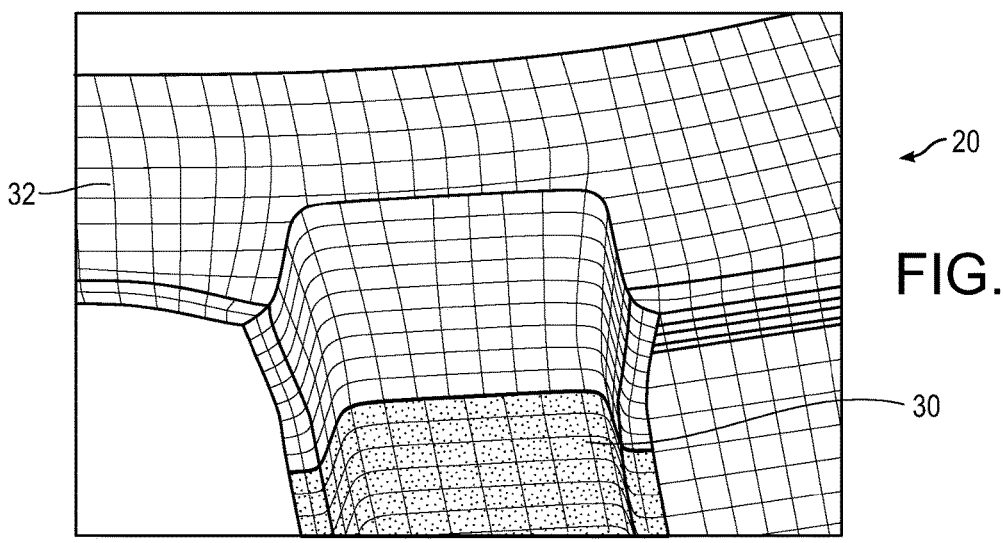
FIG. 18C is a perspective view of a finite element model of a header bow joint with disconnect joint checked off of an automated modelling system in accordance with an example embodiment.

FIG. 18B illustrates an exemplary roof bow joint created automatically by the computer system 100 with the disconnect joint checked ON based on inputs 42 and selections from the user. FIG. 18C illustrates an exemplary header joint created automatically by the computer system 100 with the disconnect joint checked OFF based on inputs 42 and selections from the user.

Figure 19A:
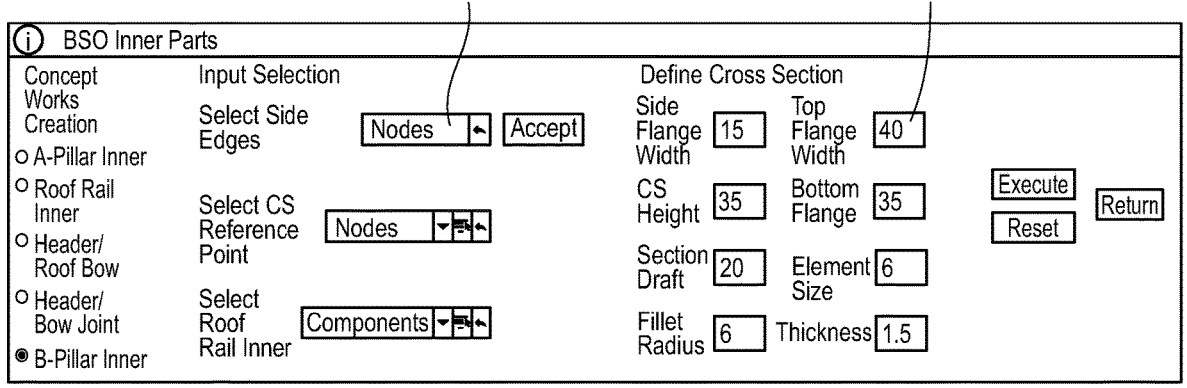
FIG. 19A is a view of an exemplary interface used for creating a B-pillar of an automated modelling system in accordance with an example embodiment.

FIG. 19A illustrates an exemplary interface 40 which may be used by the user to input 42 data to be processed by the computer system 100 in automatically creating a B-pillar inner part. The interface 40 may comprise a plurality of inputs 42 in which the user may enter data or information to be processed by the computer system 100 to form the B-pillar inner part.

It should be appreciated that the inner parts interface 40 used to create the B-pillar may vary in different embodiments, and thus should not be construed as limited by the exemplary figures. In the exemplary embodiment shown in FIG. 19A, the inner parts interface 40 for B-pillar creation includes a plurality of inputs 42. By way of example and without limitation, the inputs 42 may side edge selection, cross section reference point selection, roof rail inner selection, side flange width, CS height, section draft, fillet radius, top flange width, bottom flange width, element size, and thickness.

Figure 19B:
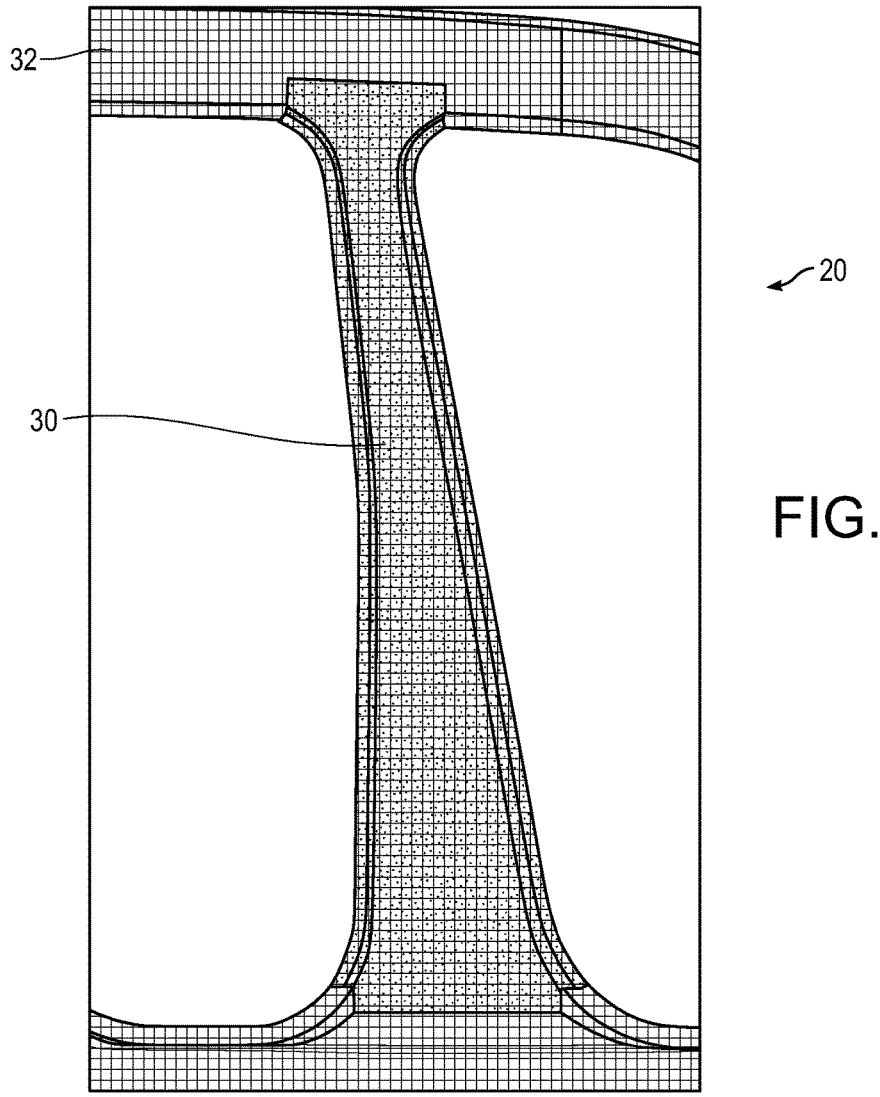
FIG. 19B is a perspective view of a finite element model of a B-pillar of an automated modelling system in accordance with an example embodiment.

With the use of the inputs 42 described above, the computer system 100 may be utilized to automatically create the B-pillar. The user may select side edges, cross section reference point, and roof rail inner selection using dropdowns 44. The user may then manually enter the side flange width, cross section height, section draft, fillet radius, top flange width, bottom flange, element size, and thickness. Using these inputs 42, the computer system 100 will automatically create the B-pillar in the finite element model 20. FIG. 19B illustrates an exemplary B-pillar created automatically by the computer system 100 based on inputs 42 and selections from the user.

v. Quick Member Creation or Adjustment.

Figure 20A:
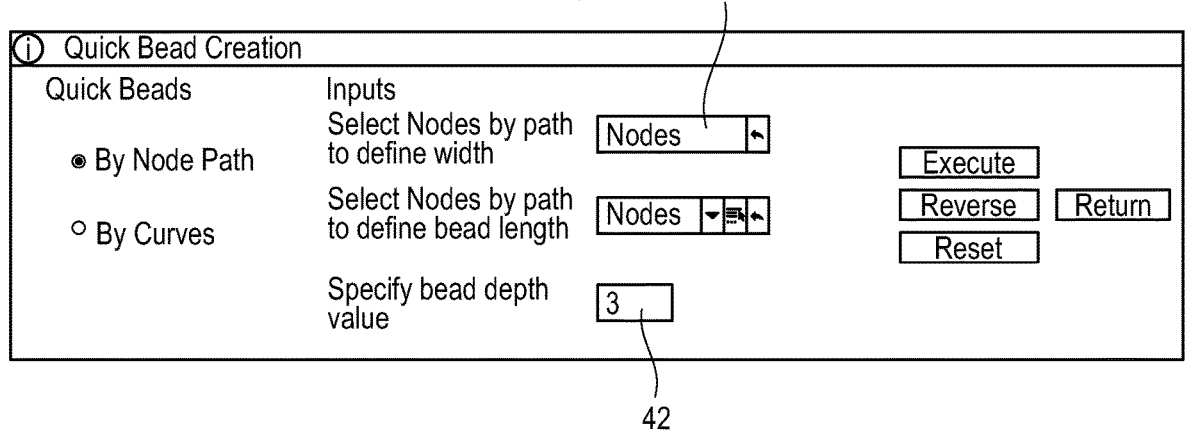
FIG. 20A is a view of an exemplary interface used for creating quick beads by node path of an automated modelling system in accordance with an example embodiment.
Figure 20B:
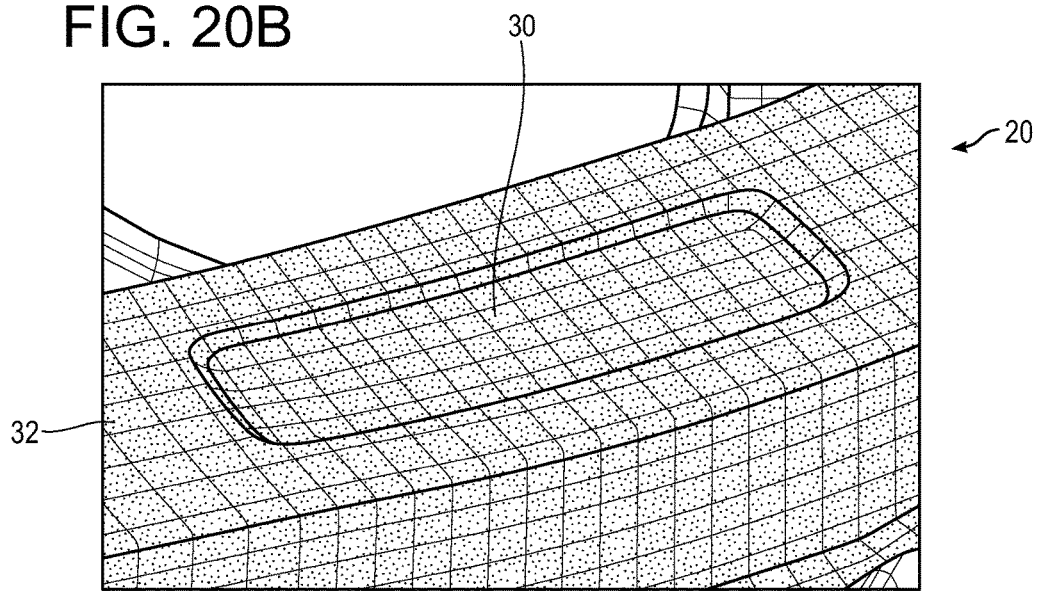
FIG. 20B is a perspective view of a finite element model of quick beads by node path of an automated modelling system in accordance with an example embodiment.
Figure 21A:
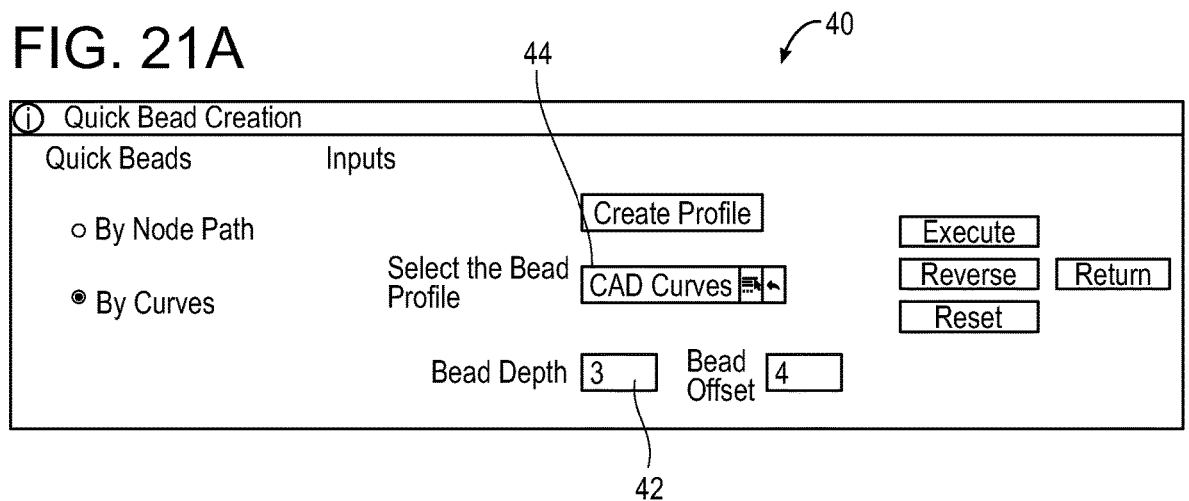
FIG. 21A is a view of an exemplary interface used for creating quick beads by curves of an automated modelling system in accordance with an example embodiment.
Figure 21B:
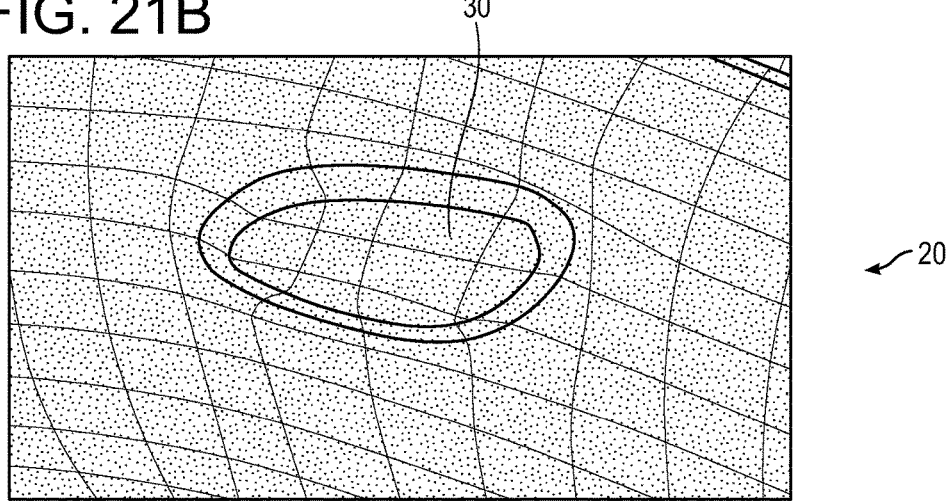
FIG. 21B is a perspective view of a finite element model of quick beads by curves of an automated modelling system in accordance with an example embodiment.
Figure 22A:
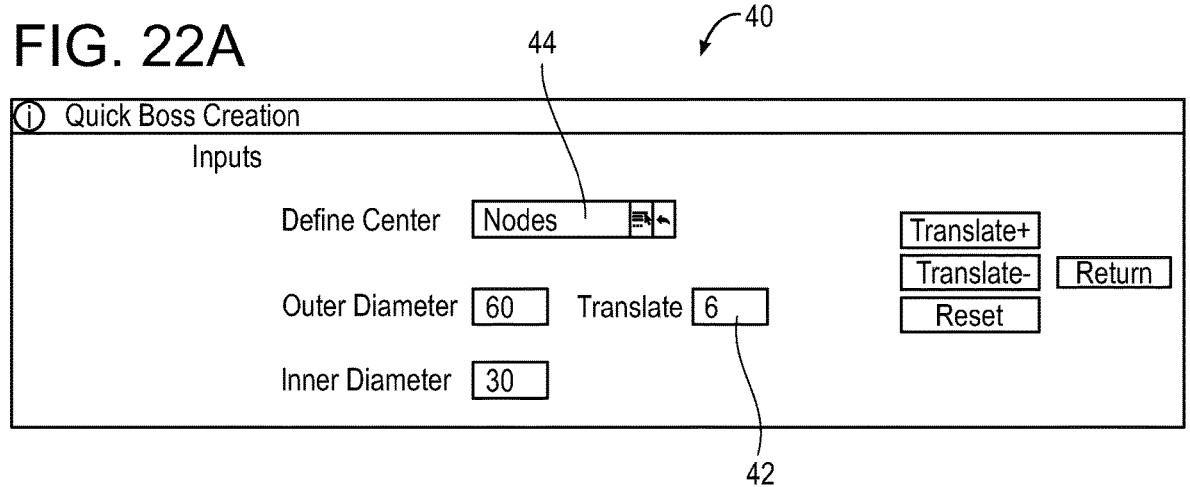
FIG. 22A is a view of an exemplary interface used for creating a quick boss of an automated modelling system in accordance with an example embodiment.
Figure 22B:
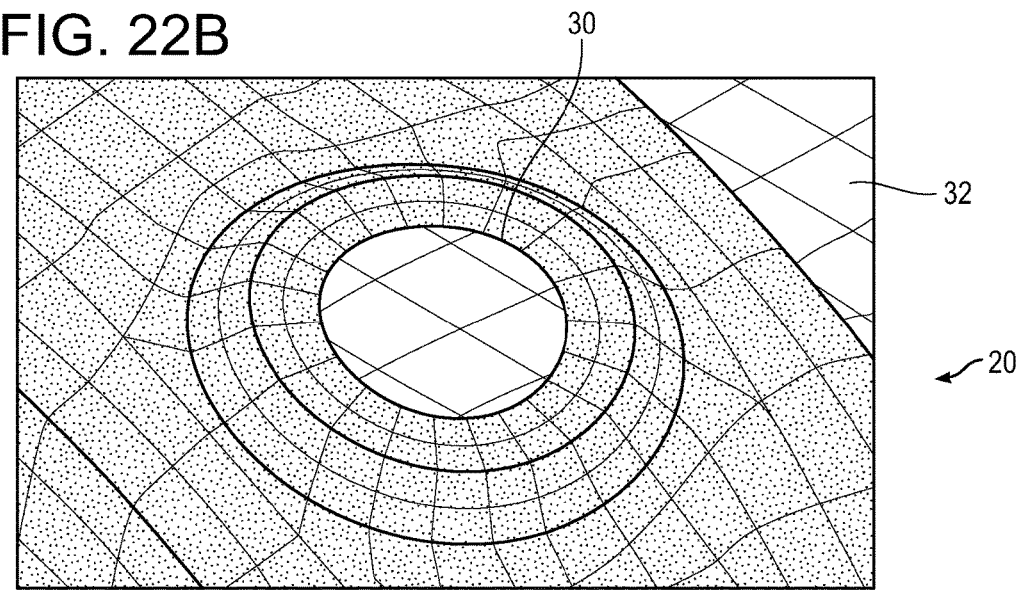
FIG. 22B is a perspective view of a finite element model of a quick boss of an automated modelling system in accordance with an example embodiment.
Figure 23A:
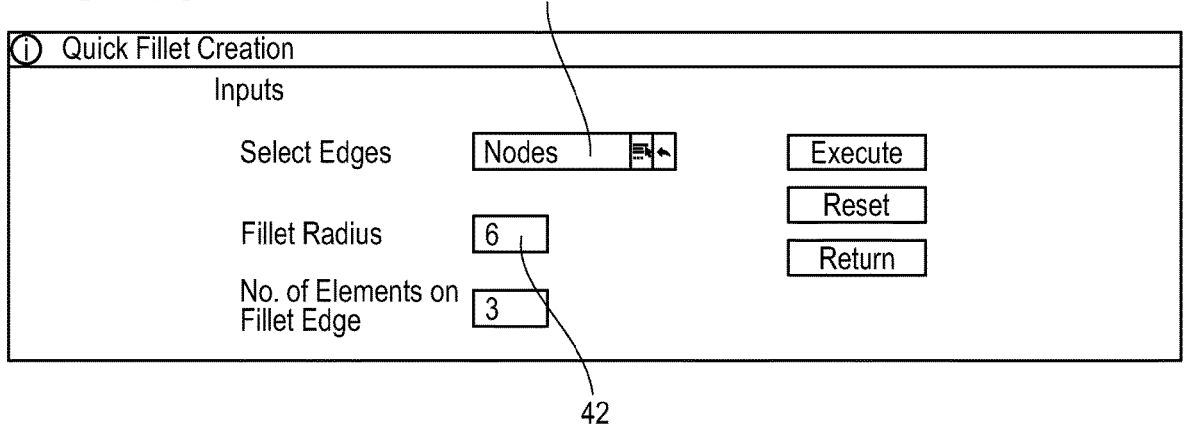
FIG. 23A is a view of an exemplary interface used for creating a quick fillet of an automated modelling system in accordance with an example embodiment.
Figure 23B:
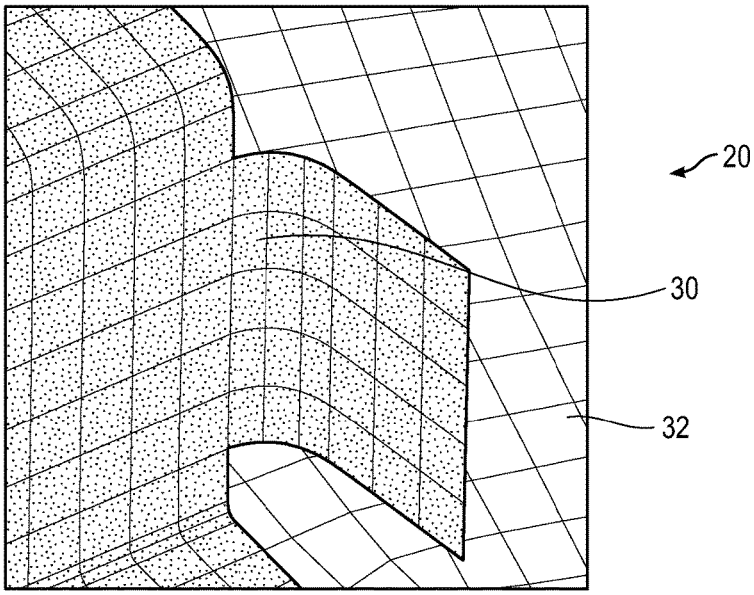
FIG. 23B is a perspective view of a finite element model of a quick fillet of an automated modelling system in accordance with an example embodiment.
Figure 24A:
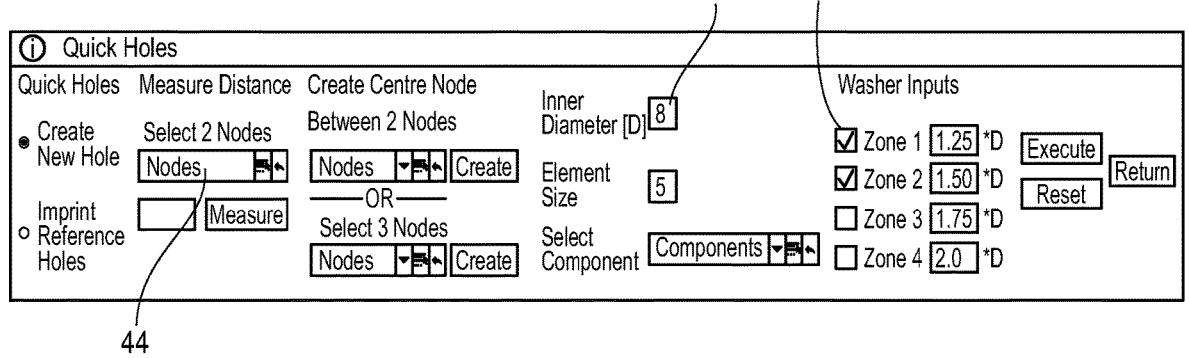
FIG. 24A is a view of an exemplary interface used for creating a new hole of an automated modelling system in accordance with an example embodiment.
Figure 24B:
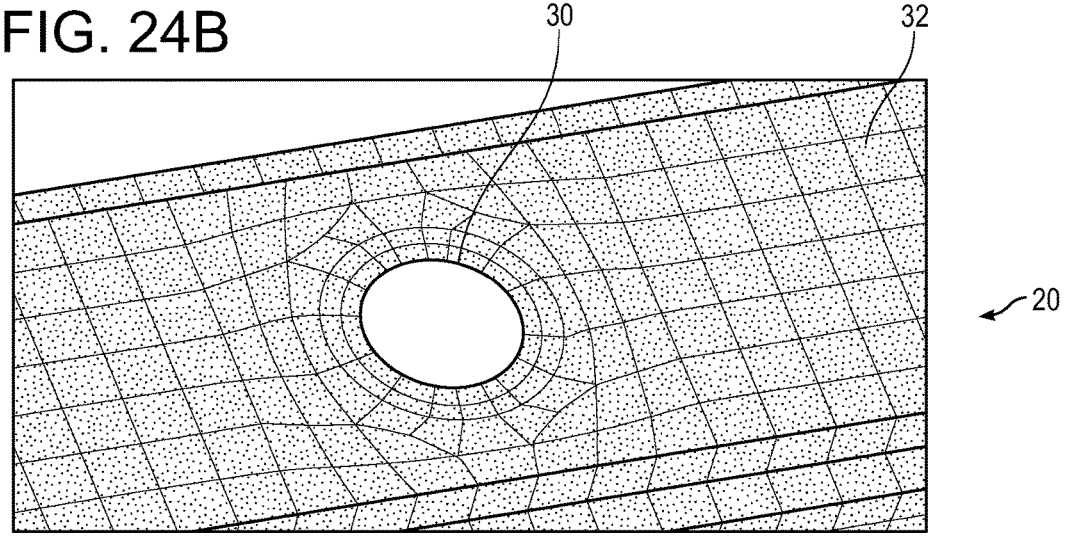
FIG. 24B is a perspective view of a finite element model of a new hole of an automated modelling system in accordance with an example embodiment.
Figure 25A:
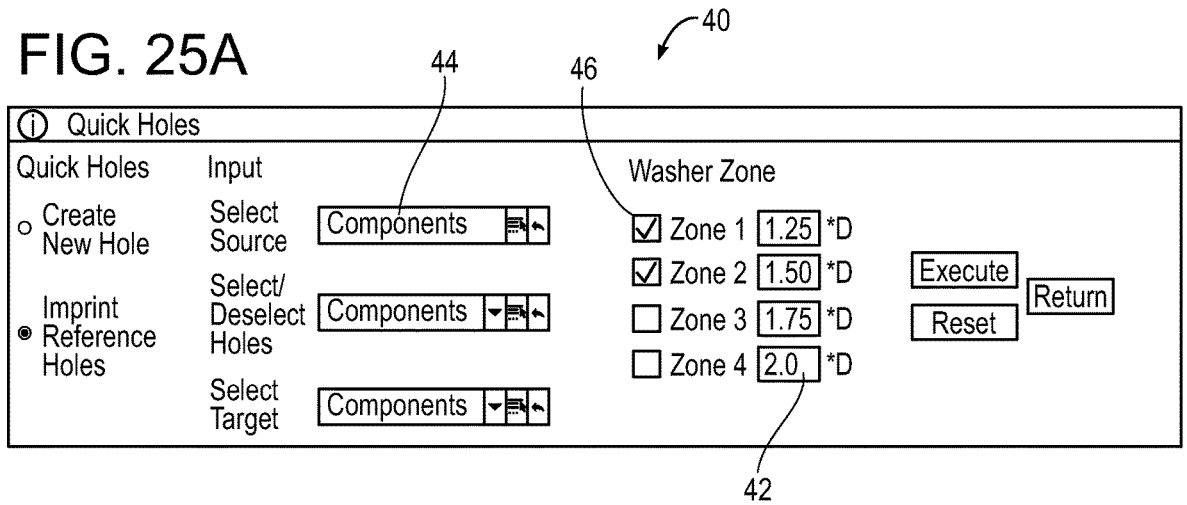
FIG. 25A is a view of an exemplary interface used for creating an imprint hole of an automated modelling system in accordance with an example embodiment.
Figure 25B:
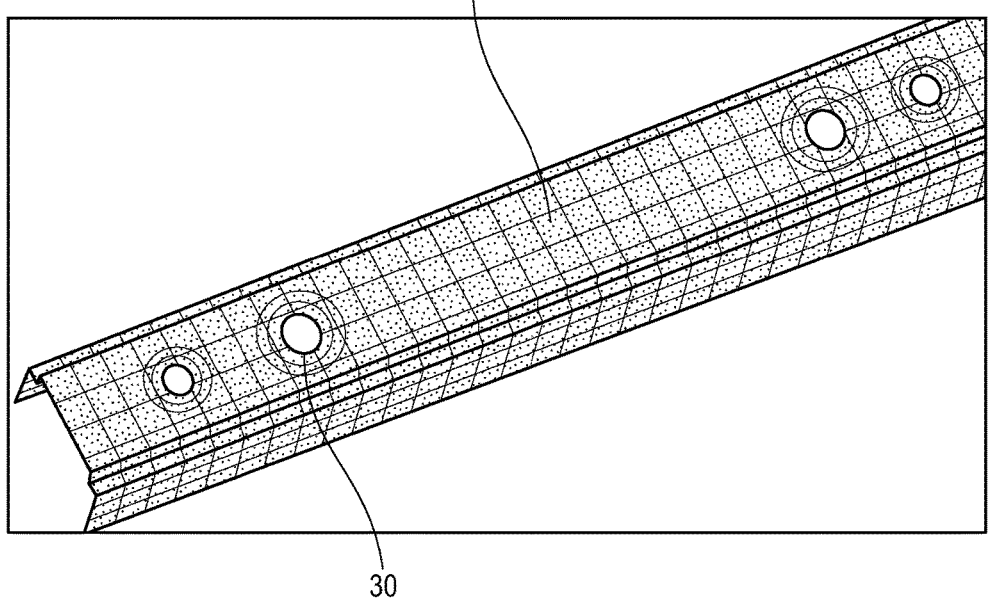
FIG. 25B is a perspective view of a finite element model of an imprint hole of an automated modelling system in accordance with an example embodiment.
Figure 26A:
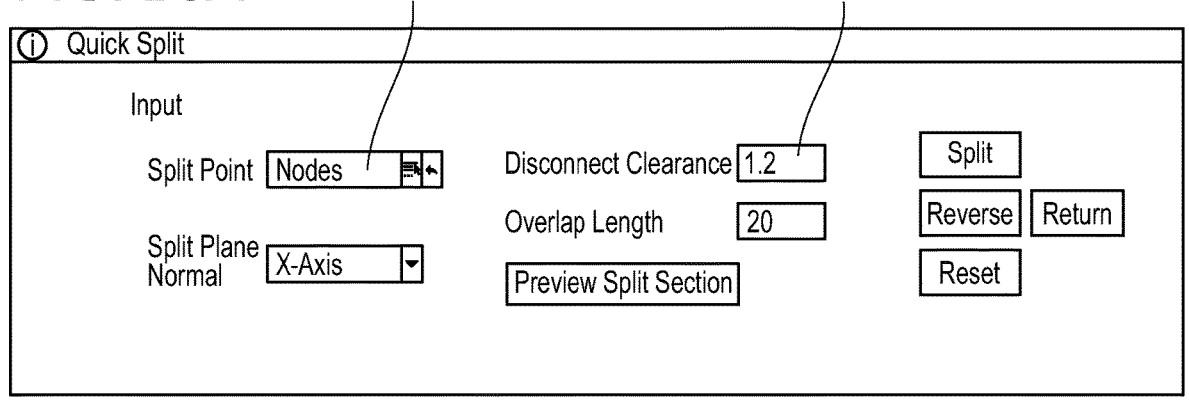
FIG. 26A is a view of an exemplary interface used for quickly splitting an element of an automated modelling system in accordance with an example embodiment.
Figure 26B:
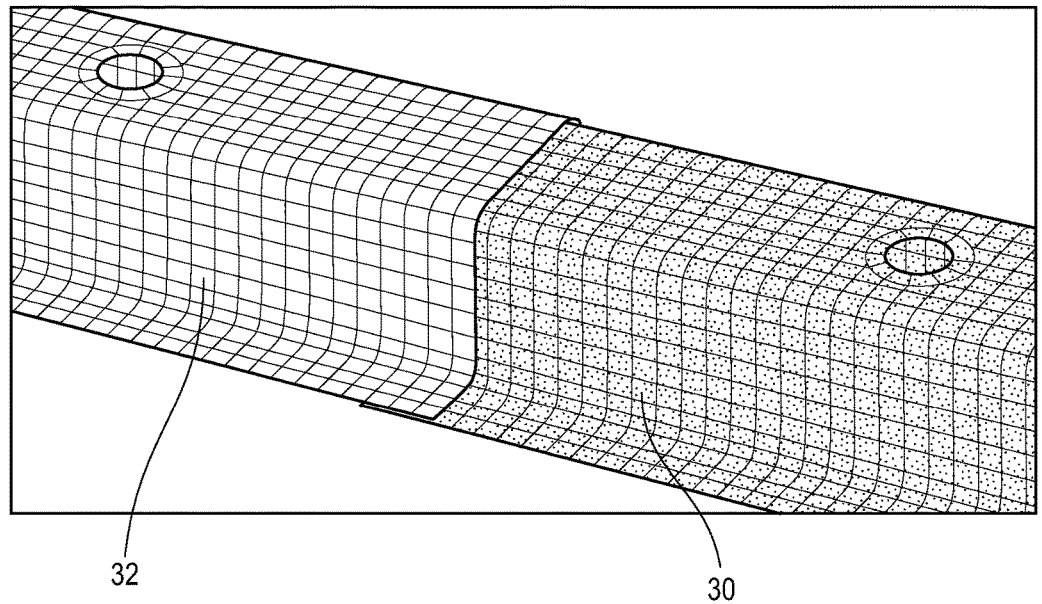
FIG. 26B is a perspective view of a finite element model of a split element of an automated modelling system in accordance with an example embodiment.

The automated modelling systems 10 may include systems and methods which allow for the quick, automated creation of various members 30, braces, and/or joints based on limited inputs 42 from a user. FIGS. 20A-26B illustrate a number of features used for such quick member 30 creation, with FIGS. 20A and 20B illustrating quick creation of beads by node path, FIGS. 21A and 21B illustrating quick creation of beads by curves, FIGS. 22A and 22B illustrating quick creation of bosses, FIGS. 23A and 23B illustrating quick creation of fillets, FIGS. 24A and 24B illustrating quick creation of new holes, FIGS. 25A and 25B illustrating quick creation of imprint holes, and FIGS. 26A and 26B illustrating quick creation of splits.

FIG. 20A illustrates an exemplary interface 40 which may be used by the user to input 42 data to be processed by the computer system 100 in automatically and quickly creating beads by node path. The interface 40 may comprise a plurality of inputs 42 in which the user may enter data or information to be processed by the computer system 100 to form the beads by node path quickly and automatically based on the user-inputted data or information.

It should be appreciated that the quick creation of beads by node path interface 40 used to create the beads by node path may vary in different embodiments, and thus should not be construed as limited by the exemplary figures. In the exemplary embodiment shown in FIG. 20A, the quick creation of beads by node path interface 40 includes a plurality of inputs 42. By way of example and without limitation, the inputs 42 may include nodes by path selection to define width, nodes by path selection to define bead length, and bead depth value.

With the use of the inputs 42 described above, the computer system 100 may be utilized to automatically and quickly create beads by node path. The user need only select nodes by path to define the bead width, select nodes by path to define the bead length, and specify a bead depth value. Based on these inputs 42, the computer system 100 will automatically and quickly create beads by node path without further interaction by the user. FIG. 20B illustrates exemplary beads which have been created automatically and quickly by node path by the computer system 100 based on inputs 42 and selections from the user.

FIG. 21A illustrates an exemplary interface 40 which may be used by the user to input 42 data to be processed by the computer system 100 in automatically and quickly creating beads by curve. The interface 40 may comprise a plurality of inputs 42 in which the user may enter data or information to be processed by the computer system 100 to form the beads by curve quickly and automatically based on the user-inputted data or information.

It should be appreciated that the quick creation of beads by curve interface 40 used to create the beads by curve may vary in different embodiments, and thus should not be construed as limited by the exemplary figures. In the exemplary embodiment shown in FIG. 21A, the quick creation of beads by curve interface 40 includes a plurality of inputs 42. By way of example and without limitation, the inputs 42 may include bead profile selection, bead depth value, and bead offset value.

With the use of the inputs 42 described above, the computer system 100 may be utilized to automatically and quickly create beads by curve. The user need only select a bead profile (in this case, CAD curves), enter a bead depth, and enter a bead offset. Based on these inputs 42, the computer system 100 will automatically and quickly create beads by curve without further interaction by the user. FIG. 21B illustrates exemplary beads which have been created automatically and quickly by curve by the computer system 100 based on inputs 42 and selections from the user.

FIG. 22A illustrates an exemplary interface 40 which may be used by the user to input 42 data to be processed by the computer system 100 in automatically and quickly creating bosses. The interface 40 may comprise a plurality of inputs 42 in which the user may enter data or information to be processed by the computer system 100 to form the bosses quickly and automatically based on the user-inputted data or information.

It should be appreciated that the quick creation of bosses interface 40 may vary in different embodiments, and thus should not be construed as limited by the exemplary figures. In the exemplary embodiment shown in FIG. 22A, the quick creation of bosses interface 40 includes a plurality of inputs 42. By way of example and without limitation, the inputs 42 may include center node selection, outer diameter, inner diameter, and translate value.

With the use of the inputs 42 described above, the computer system 100 may be utilized to automatically and quickly create bosses. The user will first define the center of the boss, such as by selecting center nodes as shown in the figure. The user will then enter values for the boss's dimensions, including entry of the outer and inner diameter values. Finally, the user will enter a translate value. Based on these inputs 42 and selections, the computer system 100 will automatically and quickly create bosses without further interaction by the user. FIG. 22B illustrates an exemplary boss which has been created automatically and quickly by the computer system 100 based on inputs 42 and selections from the user.

FIG. 23A illustrates an exemplary interface 40 which may be used by the user to input 42 data to be processed by the computer system 100 in automatically and quickly fillets in a finite element model 20. The interface 40 may comprise a plurality of inputs 42 in which the user may enter data or information to be processed by the computer system 100 to form the fillets quickly and automatically based on the user-inputted data or information.

It should be appreciated that the quick creation of fillets interface 40 may vary in different embodiments, and thus should not be construed as limited by the exemplary figures. In the exemplary embodiment shown in FIG. 23A, the quick creation of fillets interface 40 includes a plurality of inputs 42. By way of example and without limitation, the inputs 42 may include edge selection, fillet radius, and number of elements on the fillet edge.

With the use of the inputs 42 described above, the computer system 100 may be utilized to automatically and quickly create fillets. The user will first select the edges of the fillet, such as by selecting nodes as shown in the figure. The user may then enter the radius of the fillet as well as the number of elements on the fillet edge. Based on this information, the computer system 100 will automatically and quickly create fillets without further interaction by the user. The process used by the computer system 100 may vary depending on the number of common nodes. FIG. 23B illustrates a fillet that has been quickly created by the computer system 100 based on user inputs 42, FIG. 24A illustrates an exemplary interface 40 which may be used by the user to input 42 data to be processed by the computer system 100 in automatically and quickly new holes. The interface 40 may comprise a plurality of inputs 42 in which the user may enter data or information to be processed by the computer system 100 to form the new holes quickly and automatically based on the user-inputted data or information.

It should be appreciated that the quick creation of new holes interface 40 may vary in different embodiments, and thus should not be construed as limited by the exemplary figures. In the exemplary embodiment shown in FIG. 24A, the quick creation of new holes interface 40 includes a plurality of inputs 42. By way of example and without limitation, the inputs 42 may include two nodes selection, two nodes election for mid-node, three nodes selection for center node, inner diameter, element size, base component 32, and selection/values for up to four nodes with respect to washer inputs 42.

With the use of the inputs 42 described above, the computer system 100 may be utilized to automatically and quickly create new holes. The user will first measure the distance between two nodes. A center node is then created either between two nodes or between three nodes. Values for the inner diameter and element size may be entered by the user and any base components 32 may be selected. Washer inputs 42 are determined by selection of up to four nodes and entry of values for each of the selected nodes. FIG. 24B illustrates a new hole which has been created quickly and efficiently by the computer system 100 based on user inputs 42, with the new hole including two washer layers.

FIG. 25A illustrates an exemplary interface 40 which may be used by the user to input 42 data to be processed by the computer system 100 in automatically and quickly create imprint holes. The interface 40 may comprise a plurality of inputs 42 in which the user may enter data or information to be processed by the computer system 100 to form the imprint holes quickly and automatically based on the user-inputted data or information.

It should be appreciated that the quick creation of imprint holes interface 40 may vary in different embodiments, and thus should not be construed as limited by the exemplary figures. In the exemplary embodiment shown in FIG. 25A, the quick creation of imprint holes interface 40 includes a plurality of inputs 42. By way of example and without limitation, the inputs 42 may include source selection, holes selection/deselection, target selection, and selection/values for up to four nodes with respect to a washer zone.

With the use of the inputs 42 described above, the computer system 100 may be utilized to automatically and quickly create imprint holes in a target component. The user will first select the source and select/deselect holes. The user will also select a target component. The user may select up to four nodes and enter values for any of the selected nodes to define the washer zone. FIG. 25B illustrates a new imprint hole which has been quickly and efficiently created in a target component by the computer system 100 based on user inputs 42 and selections.

The systems and methods described herein may also be utilized to make quick adjustments to elements of a finite element model 20, including members 30, braces, and joints. FIG. 26A illustrates an exemplary interface 40 which may be used by the user to quickly and automatically split components of a finite element model 20 by the computer system 100 based on user inputs 42 and selections. The interface 40 may comprise a plurality of inputs 42 in which the user may enter data or information to be processed by the computer system 100 to quickly and automatically adjust components, such as by splitting, based on the user-inputted data and information.

It should be appreciated that the quick split interface 40 may vary in different embodiments, and thus should not be construed as limited by the exemplary figures. In the exemplary embodiment shown in FIG. 26A, the quick split interface 40 includes a plurality of inputs 42. By way of example and without limitation, the inputs 42 may include split point selection, split plane normal selection, disconnect clearance, and overlap length.

With use of the inputs 42 described above, the computer system 100 may be utilized to automatically and quickly split target components. The user will first select the split point, such as by nodes as shown in the figure. The user will also select the split plane normal axis and enter values for the disconnect clearance and overlap length. Using this information, the computer system 100 will quickly and automatically split the target component at the split point with the split plane normal axis, disconnect clearance, and overall length selected by the user. FIG. 26B illustrates a component which has been automatically and quickly split by the computer system 100 based on user inputs 42 and selections.

FIG. 27A illustrates an exemplary interface 40 which may be used by the user to quickly and automatically adjust a flange of a finite element model 20 by the computer system 100 based on user inputs 42 and selections. The interface 40 may comprise a plurality of inputs 42 in which the user may enter data or information to be processed by the computer system 100 to quickly and automatically adjust components, such as by adjusting a flange, based on the user-inputted data and information.

It should be appreciated that the adjust flange interface 40 may vary in different embodiments, and thus should not be construed as limited by the exemplary figures. In the exemplary embodiment shown in FIG. 27A, the adjust flange interface 40 includes a plurality of inputs 42. By way of example and without limitation, the inputs 42 may include element selection, base part selection, deformable layers, and shell gap.

With use of the inputs 42 described above, the computer system 100 may be utilized to automatically and quickly adjust a flange in a finite element model 20. The user first selects elements and base parts via dropdowns 44. The user may then enter a value for deformable layers. The user may select whether there is a shell gap and, if selected, may enter a value. Using this information, the computer system 100 will quickly and automatically adjust the flange based on the user inputs 42. FIGS. 27A, 27B, and 27C illustrate adjustment of a flange quickly and automatically by a computer system 100 in response to user inputs 42.

vi. Parameterization.

Figure 28A:
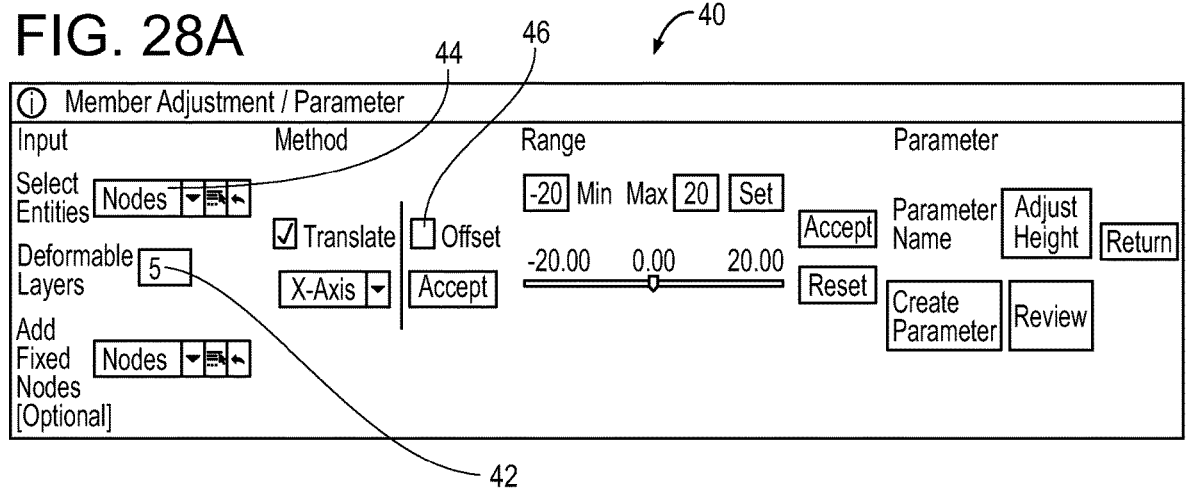
FIG. 28A is a view of an exemplary interface used for member adjustment and parametrization of an automated modelling system in accordance with an example embodiment.

The systems and methods described herein may also be utilized for quickly and automatically parameterizing various elements of a finite element model 20. FIG. 28A illustrates an exemplary interface 40 which may be used by a user to both adjust and parameterize elements of a finite element model 20 by a computer system 100 based on user inputs 42 and selections.

The interface 40 may comprise a plurality of inputs 42 in which the user may enter data or information to be processed by the computer system 100 to quickly and automatically adjust and parameterize components based on the user-inputted data and information. By way of example and without limitation, the inputs 42 may include entities selection, fixed nodes selection (optional), deformable layers, translate, offset, translate direction, minimum range, maximum range, and parameter name.

Figure 28B:
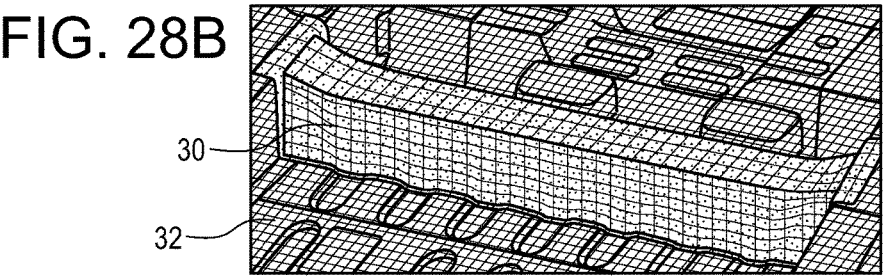
FIG. 28B is a perspective view of a finite element model of a member of an automated modelling system in accordance with an example embodiment.
Figure 28C:
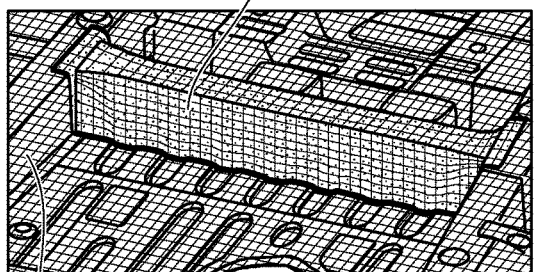
FIG. 28C is a perspective view of a finite element model of a parametrized member of an automated modelling system in accordance with an example embodiment.
Figure 28D:
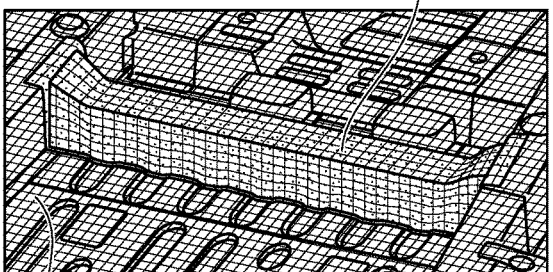
FIG. 28D is a perspective view of a finite element model of an adjusted member of an automated modelling system in accordance with an example embodiment.

The user may select entities, such as by nodes as shown in the figure. If desired, the user may select fixed nodes which will not be adjusted. The user may also select a number of deformable layers to be adjusted. The user may then select a translate axis and whether to offset. The translate direction, including minimum and maximum ranges, may be set. Finally, a parameter name may be entered to be associated with any created parameters. Using this information, the computer system 100 will quickly and automatically adjust or parameterize the selected elements of the finite element model 20. FIGS. 28B, 28C, and 28D illustrate the adjustment/parameterization of a member 30 in a finite element model 20.

Unless otherwise defined, all technical and scientific terms used herein have the same meaning as commonly understood by one of ordinary skill in the art to which this invention belongs. Although methods and materials similar to or equivalent to those described herein can be used in the practice or testing of the automated modelling system, suitable methods and materials are described above. All publications, patent applications, patents, and other references mentioned herein are incorporated by reference in their entirety to the extent allowed by applicable law and regulations. The automated modelling system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A method for automated generation of a member in a finite element model by a computer system, comprising:
    receiving, from a user, a cross-section input identifying a cross-section of the member to be automatically generated in the finite element model by the computer system;
    receiving, from the user, an identification of a base component of the finite element model to which the member to be automatically generated in the finite element model is to be connected in the finite element model by the computer system;

receiving, from the user, a trajectory input identifying a trajectory of the member to be generated by the computer system;

receiving, from the user, an instruction as to whether the member is to follow the base component in the finite element model by the computer system;

creating a one-dimensional mesh for the member to be generated in the finite element model by the computer system;

creating a two-dimensional mesh for the member to be generated in the finite element model by the computer system; and automatically generating the member in the finite element model by the computer system without use of pre-existing CAD data based on the cross-section input and the trajectory input received from the user by the computer system;

wherein the member is automatically generated so as to follow a contour of the base component by the computer system if the user instruction was to follow the base component;

wherein the member is automatically generated so as to not follow the contour of the base component by the computer system if the user instruction was to not follow the base component.

2. The method of claim 1, wherein the one-dimensional mesh is created for the member by the computer system based on the cross-section input received from the user by the computer system.

3. The method of claim 2, wherein the two-dimensional mesh is created for the member by the computer system based on the one-dimensional mesh and the trajectory input received from the user by the computer system.

4. The method of claim 1, further comprising the step of receiving, from the user, an identification of a direction of extension of the member to be generated in the finite element model by the computer system.

5. The method of claim 1, further comprising the step of preventing any intersection or penetration of the member with the base component by the computer system when automatically generating the member in the finite element model.

6. The method of claim 1, further comprising the step of automatically parameterizing the member as a onetime morph by the computer system.

7. The method of claim 1, further comprising the step of changing one or more dimensions of the member as a onetime morph by the computer system.

8. The method of claim 1, wherein the cross-section input of the member is comprised of a sketch, received from the user, of the cross-sectional information of the member.

9. The method of claim 1, wherein the trajectory input is comprised of a trajectory of the member extracted from an existing finite element mesh.

10. The method of claim 1, wherein the trajectory input of the member is comprised of a sketch, received from the user, of the trajectory of the member.

11. The method of claim 1, wherein the trajectory of the member is imported from an external source, by the user, to the computer system.

12. A method for automated generation of a member in a finite element model by a computer system, comprising:

receiving, from a user, a cross-section input identifying a cross-section of the member to be automatically generated in the finite element model by the computer system;

receiving, from the user, an identification of a base component of the finite element model to which the member to be automatically generated in the finite element model is to be connected in the finite element model by the computer system;

receiving, from the user, a trajectory input identifying a trajectory of the member to be generated by the computer system;

creating a one-dimensional mesh for the member to be automatically generated in the finite element model by the computer system based on the cross-section input received from the user;

creating a two-dimensional mesh for the member to be automatically generated in the finite element model by the computer system based on both the one-dimensional mesh and the trajectory input received from the user; and automatically generating the member in the finite element model by the computer system without use of pre-existing CAD data based on the cross-section input and the trajectory input received from the user by the computer system.

13. The method of claim 12, further comprising the step of receiving, from the user, an instruction as to whether the member is to follow the base component in the finite element model by the computer system, wherein the member is automatically generated so as to follow a contour of the base component by the computer system if the instruction was to follow the base component, and wherein the member is automatically generated so as to not follow the contour of the base component by the computer system if the instruction was to not follow the base component.

* * * * *